US012673715B2

(12) United States Patent
Yamashita et al.

(10) Patent No.: US 12,673,715 B2
(45) Date of Patent: Jul. 7, 2026

(54) ELECTRODE STRUCTURE, STEERING WHEEL, AND METHOD FOR MANUFACTURING STEERING WHEEL

(71) Applicant: Panasonic Intellectual Property Management Co., Ltd., Osaka (JP)

(72) Inventors: Yasuhiro Yamashita, Osaka (JP); Takumi Yamada, Osaka (JP); Takateru Sawada, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 724 days.

(21) Appl. No.: 18/157,900

(22) Filed: Jan. 23, 2023

(65) Prior Publication Data

US 2023/0271641 A1 Aug. 31, 2023

(30) Foreign Application Priority Data

Feb. 25, 2022 (JP) ................................. 2022-028007
Sep. 20, 2022 (JP) ................................. 2022-148967

(51) Int. Cl.
B62D 1/06 (2006.01)
B62D 1/04 (2006.01)

(52) U.S. Cl.
CPC ................. B62D 1/06 (2013.01); B62D 1/04 (2013.01); B62D 1/046 (2013.01); B62D 1/065 (2013.01)

(58) Field of Classification Search
CPC . B62D 1/04; B62D 1/046; B62D 1/06; B62D 1/065; H05B 1/0236
See application file for complete search history.

(56) References Cited

U.S. PATENT DOCUMENTS

| | | | |
|---|---|---|---|
| 9,810,727 B2 * | 11/2017 | Kandler | ................. B62D 1/046 |
| 10,252,741 B2 * | 4/2019 | Okazaki | .............. G01D 5/2405 |
| 12,202,535 B2 * | 1/2025 | Yamashita | ................ B32B 5/18 |
| 2005/0050981 A1 * | 3/2005 | Warhover | ................ B62D 1/06 |
| | | | 74/552 |
| 2009/0007721 A1 * | 1/2009 | Cortina | .................... B62D 1/06 |
| | | | 74/558 |
| 2011/0073582 A1 * | 3/2011 | Morita | ................... B62D 1/065 |
| | | | 219/204 |
| 2014/0253151 A1 * | 9/2014 | Kandler | ............... B60N 2/0035 |
| | | | 324/686 |
| 2017/0210408 A1 * | 7/2017 | Okazaki | ................... B62D 1/06 |
| 2017/0282955 A1 * | 10/2017 | Morita | ................... B62D 1/065 |
| 2019/0389489 A1 * | 12/2019 | Okazaki | ................ B62D 1/046 |

(Continued)

FOREIGN PATENT DOCUMENTS

| | | | | |
|---|---|---|---|---|
| DE | 102019002387 A1 * | 10/2020 | ........... | A61B 5/6893 |
| JP | 2011073545 A * | 4/2011 | ............... | B62D 1/04 |
| WO | WO 2018145868 A1 | 8/2018 | | |

*Primary Examiner* — Alain Chau

(74) *Attorney, Agent, or Firm* — Seed Intellectual Property Law Group LLP

(57) ABSTRACT

An electrode structure includes an insulator and a first electrode that is in the shape of a line, where the first electrode is disposed on a first surface of the insulator, and the first surface is on an opposite side of the insulator relative to a surface of the insulator that faces a core metal of a steering wheel. The insulator includes an engagement portion that engages an engagement-target portion included in the core metal. After the electrode structure is engaged with the core metal, a foam is shaped into a mold to form the steering wheel.

20 Claims, 9 Drawing Sheets

(56)        References Cited

U.S. PATENT DOCUMENTS

2020/0017136 A1      1/2020  Lammers et al.
2020/0239060 A1*     7/2020  Hyoudou ............... B62D 1/065
2021/0036438 A1*     2/2021  Yamashita ............... H01R 4/06

* cited by examiner

ELECTRODE STRUCTURE, STEERING WHEEL, AND METHOD FOR MANUFACTURING STEERING WHEEL

CROSS REFERENCE TO RELATED APPLICATIONS

The present application is based on and claims priority of Japanese Patent Application No. 2022-028007 filed on Feb. 25, 2022, and Japanese Patent Application No. 2022-148967 filed on Sep. 20, 2022.

FIELD

The present disclosure relates to an electrode structure, a steering wheel, and a method for manufacturing the steering wheel.

BACKGROUND

A conventional method for making a notch in a foam of a steering wheel using a cutting tool and inserting a conductor of a sensor into each of the first layer and the second layer of the notch has been disclosed (for example, see Patent Literature (PTL) 1).

CITATION LIST

Patent Literature

PTL 1: WO 2018/145868

SUMMARY

The method according to PTL 1 can be improved upon.

In view of this, the electrode structure and the like according to the present disclosure are capable of improving upon the above related art.

An electrode structure according to one aspect of the present disclosure is disposed on an outer circumference of a core metal of a steering wheel provided in a vehicle, and includes: an insulator; and a first electrode in a shape of a line, where the first electrode is disposed on a first surface of the insulator, and the first surface is on an opposite side of the insulator relative to a surface of the insulator that faces the core metal of the steering wheel. The insulator includes an engagement portion that engages the core metal.

These generic or specific aspects may be realized by a system, a device or apparatus, a method, a recording medium, a computer program, or any combination thereof.

The electrode structure and the like according to one aspect of the present disclosure are capable of improving upon the above related art.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
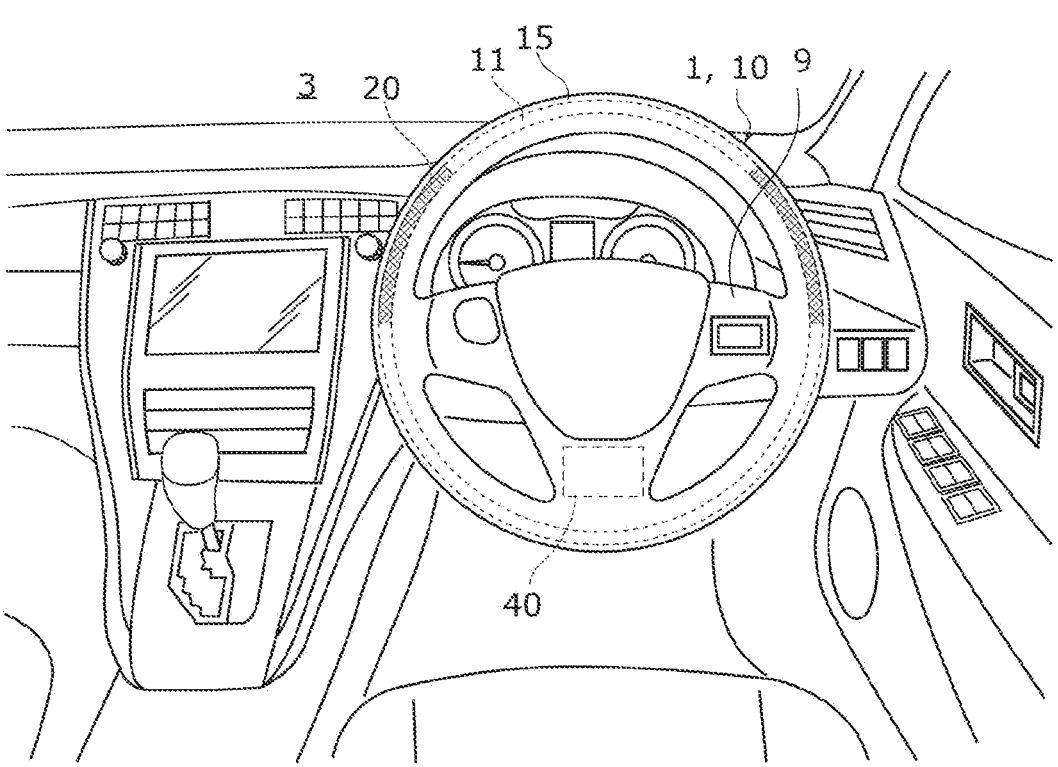
FIG. 1 illustrates a passenger compartment of a vehicle in which a steering wheel according to an embodiment is disposed.

Unfortunately, the conventional technique disclosed in PTL 1 can be improved upon in regard to the appearance of the steering wheel since there is a notch in the foam of the steering wheel. Moreover, making the notch and inserting the conductor of the sensor increases man-hours. When a heating function is mounted on the steering wheel, a heater wire is to be additionally provided in the steering wheel. For these reasons, the conventional technique can be improved upon in terms of steering wheel manufacturing cost.

In view of this, an electrode structure according to one aspect of the present disclosure is disposed on an outer circumference of a core metal of a steering wheel provided in a vehicle, and includes: an insulator; and a first electrode in a shape of a line, where the first electrode is disposed on a first surface of the insulator, and the first surface is on an opposite side of the insulator relative to a surface of the insulator that faces the core metal of the steering wheel. The insulator includes an engagement portion that engages the core metal.

According to this configuration, the electrode structure can be attached to the core metal in advance. The electrode structure can therefore be disposed inside the steering wheel when forming the steering wheel. For this reason, unlike the conventional technique, it is not necessary to make a notch in the steering wheel after forming the steering wheel to dispose the first electrode.

Therefore, owing to the electrode structure, an increase in manufacturing cost can be inhibited without compromising the appearance of the steering wheel.

In the electrode structure according to one aspect of the present disclosure, the first electrode is configured to function both as a sensor electrode that detects a driver's grip on the steering wheel and as a heater wire that warms the steering wheel.

With this, since the first electrode can be configured to function both as a sensor electrode and a heater wire, there is no need to separately provide a heater wire in the steering wheel. For this reason, an increase in the manufacturing cost of the steering wheel to which the electrode structure is applied can be inhibited.

In the electrode structure according to one aspect of the present disclosure, the first electrode is a heater wire that warms the steering wheel.

With this, it is possible to warm the steering wheel by the first electrode that is in the shape of a line and included in the electrode structure attached to the core metal.

In the electrode structure according to one aspect of the present disclosure, the first electrode is a sensor electrode that detects a driver's grip on the steering wheel.

With this, it is possible to detect the driver's grip on the steering wheel by the first electrode that is in the shape of a line and included in the electrode structure attached to the core metal.

The electrode structure according to one aspect of the present disclosure further includes a second electrode disposed on a second surface of the insulator, the second surface being on an opposite side of the insulator relative to the first surface.

With this, the electrode structure that includes the second electrode can be attached to the core metal in advance. The electrode structure can therefore be disposed inside the steering wheel when forming the steering wheel. For this reason, unlike the conventional technique, it is not necessary to make a notch in the steering wheel after forming the steering wheel to dispose the second electrode.

An electrode structure according to one aspect of the present disclosure is disposed on an outer circumference of a core metal of a steering wheel provided in a vehicle, and includes: a first insulator; a resin sheet disposed on a first surface of the first insulator, the first surface being on an opposite side of the first insulator relative to a surface of the first insulator that faces the core metal of the steering wheel; a first electrode in a shape of a line, the first electrode being disposed on one surface of the resin sheet; and a second electrode disposed on the other surface of the resin sheet, the other surface being a rear surface of the one surface of the resin sheet and being a surface of the resin sheet that faces the first surface of the first insulator. The first insulator includes an engagement portion that engages the core metal. The first electrode is configured to function both as a sensor electrode that detects a driver's grip on the steering wheel and as a heater wire that warms the steering wheel.

With this, the first electrode can be disposed on one surface of a resin sheet and the second electrode can be disposed on the other surface of the resin sheet. It is therefore possible, with the electrode structure according to the present disclosure, to inhibit an increase in manufacturing cost by inhibiting an increase in the number of components of the electrode structure, compared with the case of using a resin sheet for each of the first electrode and the second electrode. This electrode structure also has the same advantageous effects as described above.

A steering wheel according to one aspect of the present disclosure includes: the electrode structure described above; the core metal; and a foam that covers the core metal.

The steering wheel configured in this manner also has the same advantageous effects as described above.

A method for manufacturing a steering wheel according to one aspect of the present disclosure includes: engaging the engagement portion included in the electrode structure of a steering wheel with an engagement-target portion included in the core metal; and covering the core metal using the foam while the engagement portion is engaged with the engagement-target portion.

With this, the electrode structure can be firmly fastened to the core metal by the engagement of the engagement portion and the engagement-target portion. For this reason, it is possible to inhibit the insulator from being displaced with respect to the core metal or being rotationally displaced with respect to the circumferential direction of the steering wheel due to pressure at the time of resin molding the steering wheel. The steering wheel manufacturing method also has the same advantageous effects as described above.

In the electrode structure, in a cross section of the steering wheel taken in a plane perpendicular to a circumferential direction of the steering wheel: the first electrode is disposed along a shape of the first surface of the insulator; and the second electrode is disposed along a shape of the second surface of the insulator.

Since this allows the distance between the first electrode and the second electrode to be uniform, it is possible to accurately detect the driver's hand gripping the steering wheel regardless of which portion of the steering wheel the hand grips in an area in which the electrode structure is disposed.

In the electrode structure, the insulator includes a first insulator and a second insulator. The first insulator includes the first surface and the second surface. The first electrode is disposed on the first surface of the first insulator. The second electrode is disposed on the second surface of the first insulator, the second surface being on an opposite side of the first insulator relative to the first surface. The second insulator is disposed between the second electrode and the core metal, and includes the engagement portion that engages the core metal.

This allows the second insulator to position the second electrode away from the core metal and allows the first insulator to position the first electrode away from the second electrode and the core metal. Since the first electrode and the second electrode can be disposed on the first insulator, the member in which the first insulator, the first electrode, and the second electrode are integrated can be easily assembled to the core metal.

In the electrode structure, in a cross section of the steering wheel taken in a plane perpendicular to a circumferential direction of the steering wheel, the first insulator, the second insulator, the first electrode, and the second electrode are disposed at least in a range from an outer circumferential side of the steering wheel to an inner circumferential side of the steering wheel.

With this, the electrode structure can be disposed at a position where the driver's hand easily comes into contact with the surface of the steering wheel when the driver grips the steering wheel with their hand. Accordingly, it is possible to detect the driver's hand gripping the steering wheel.

In the electrode structure, the first insulator comprises a resin material. The second insulator comprises a resin material. The first electrode includes metal plating or a metal thin film. The second electrode includes metal plating, a metal thin film, a metal sheet, or a metal plate.

With this, since the first electrode and the second electrode can be disposed on the first insulator, the member in which the first insulator, the second insulator, the first electrode, and the second electrode are integrated can be easily assembled to the core metal. Furthermore, since the second insulator is disposed between the first insulator and the second electrode, the second insulator can position the first electrode away from the core metal.

In the electrode structure, the first insulator comprises a resin material. The second insulator comprises a resin material. The first electrode includes a resin sheet and a conducting wire. The conducting wire is disposed on and sewed to a surface of the resin sheet with a sewing thread, the surface being on an opposite side of the resin sheet relative to a surface of the resin sheet that faces the first surface of the first insulator. The second electrode includes metal plating, a metal thin film, a metal sheet, or a metal plate.

With this, when disposing the first electrode on the first surface of the first insulator and disposing the second electrode on the second surface of the first insulator, the resin sheet is a material soft enough to sew the conducting wire with a sewing thread. It is therefore possible to readily dispose the first electrode and the second electrode along the shape of the first insulator even without a forming process performed along the shapes of the first surface and the second surface. For this reason, it is possible to inhibit an increase in the processes related to the disposing of the first electrode on the first surface of the first insulator and the disposing of the second electrode on the second surface of the first insulator.

In the electrode structure, the first insulator includes a first positioning portion, and the second insulator includes a second positioning portion that interlocks with the first positioning portion.

With this, when assembling the first insulator to the second insulator, the first positioning portion and the second positioning portion can be interlocked. Since this positions the first insulator and the second insulator, misalignment of the first insulator and the second insulator in the circumferential direction can be inhibited, making it possible to easily and properly assemble the first insulator and the second insulator.

In the electrode structure, the first electrode is exclusively used as the sensor electrode or is exclusively used as the heater wire.

With this, when driving vehicle 3 in a cold area, it is possible not only to warm the steering wheel by turning ON a heating function to supply power to the first electrode (heater wire), but also to detect whether the driver's hand grips the steering wheel.

In the electrode structure, when the first electrode is used as the sensor electrode, an AC voltage is applied to the first electrode, the AC voltage having a same phase as an AC voltage applied to the second electrode.

With this, when the first electrode is used as a sensor electrode, the capacitance formed between the first electrode and the core metal can be canceled or reduced. Accordingly, if a control circuit for detecting the driver's hand gripping the steering wheel is used, the control circuit will be able to accurately detect the capacitance formed between the first electrode and the driver's hand when the hand grips the steering wheel.

In the electrode structure, the engagement portion is engaged with an engagement-target portion included in the core metal.

With this, the engagement of the engagement portion and the engagement-target portion can ensure the distance between the first electrode and the insulator and maintain the postures of the first electrode and the insulator. For this reason, when the steering wheel is resin-molded, the electrode structure can be assembled to the steering wheel.

The engagement of the engagement portion and the engagement-target portion alone allows the first insulator to position the first electrode and the second electrode away from the core metal. With this, the member in which the first insulator and the first electrode are integrated can be easily assembled to the core metal.

The electrode structure can be firmly fastened to the core metal by the engagement of the engagement portion and the engagement-target portion. For this reason, it is possible to inhibit the insulator from being displaced with respect to the core metal or being rotationally displaced with respect to the circumferential direction of the steering wheel due to pressure at the time of resin molding the steering wheel. This consequently can inhibit an increase in the processes related to the manufacturing of the steering wheel and inhibit an increase in manufacturing cost.

Hereinafter, embodiments will be described in detail with reference to the drawings.

The embodiments described below each present a general or specific example. The numerical values, shapes, materials, elements, the arrangement and connection of the elements, steps, order of the steps, etc., described in the following embodiments are mere examples, and therefore are not intended to limit the present disclosure. Accordingly, among elements in the following embodiments, those not appearing in any of the independent claims are described as optional elements.

The figures are schematic diagrams and are not necessarily precise illustrations. In the figures, like elements share like reference signs.

In the following embodiments, expressions such as "approximately equal intervals" and "T-shaped" are used. For example, "approximately equal intervals" and "T-shaped" not only mean exactly equal intervals and exactly T-shaped, but also includes substantially equal intervals and substantially T-shaped, i.e., includes an error of approximately several percent. In addition, "approximately equal intervals" and "T-shaped" mean equal intervals or T-shaped to an extent that the advantageous effects of the present disclosure can be achieved. The same applies to other expressions using "approximately" and "shaped".

Embodiment

<Configuration>

First, the configuration of steering wheel 1 will be described with reference to FIG. 1 through FIG. 7B.

Figure 2:
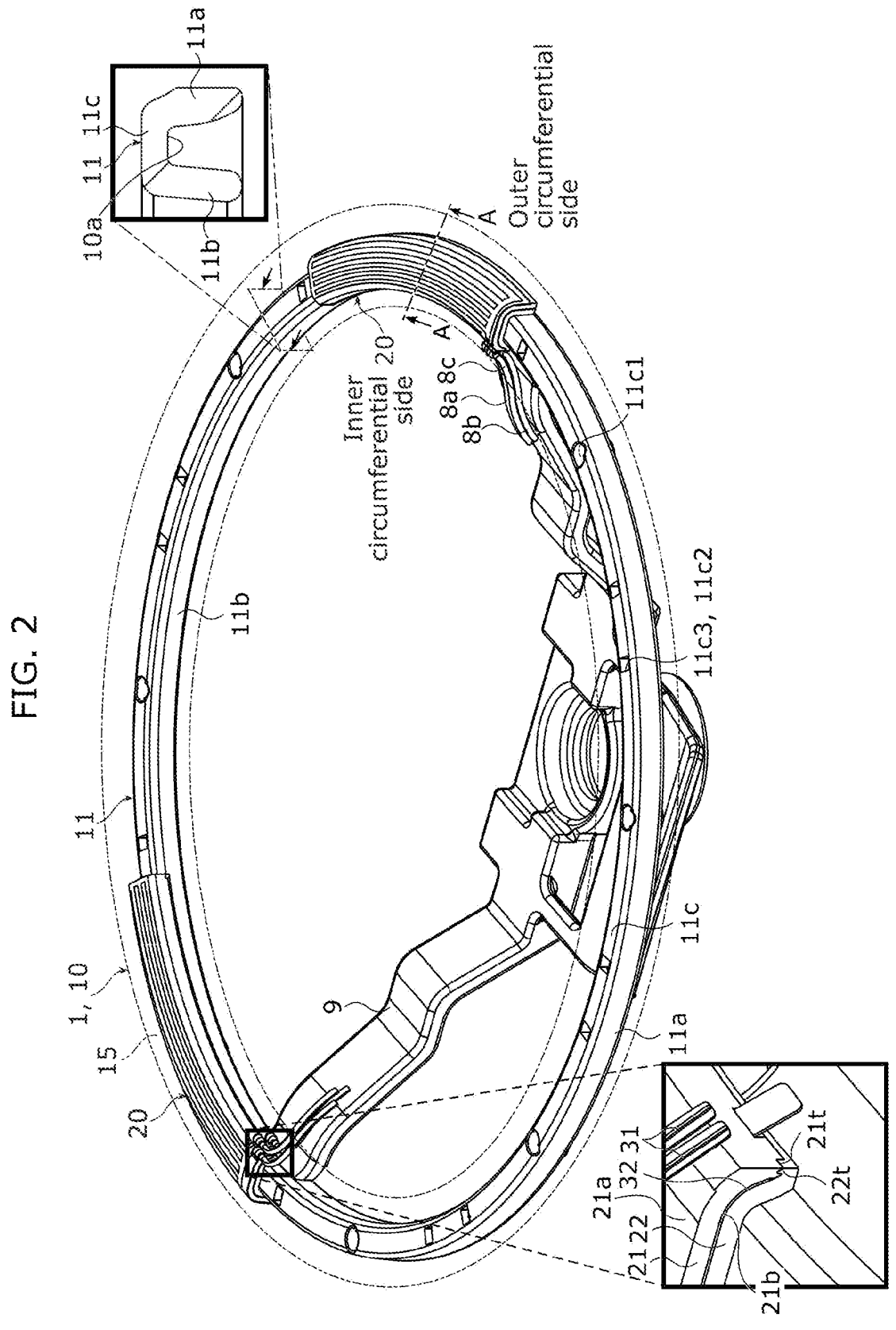
FIG. 2 includes a perspective view of a steering wheel according to the embodiment, a cross-sectional view of a core metal taken at the dotted and dashed line in FIG. 2, and a partial enlarged view of an electrode structure.
Figure 3:
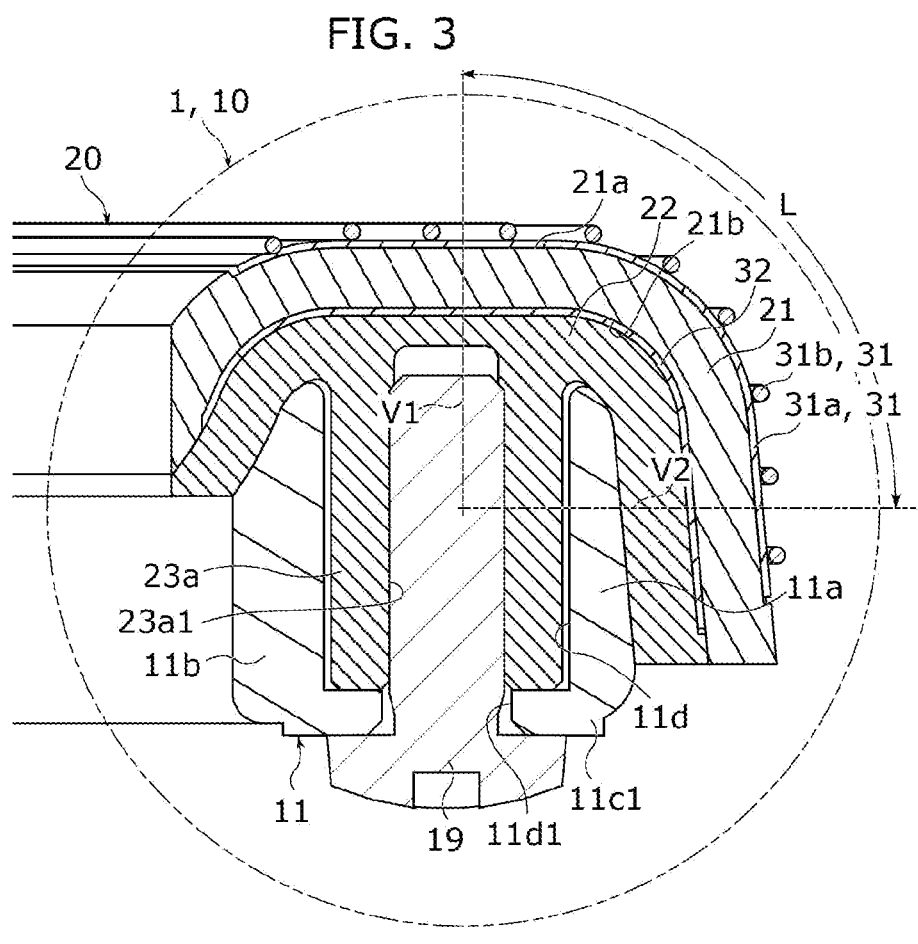
FIG. 3 is a cross-sectional view illustrating a first engagement-target portion and a first engagement portion of the steering wheel taken at line A-A in FIG. 2.
Figure 4:
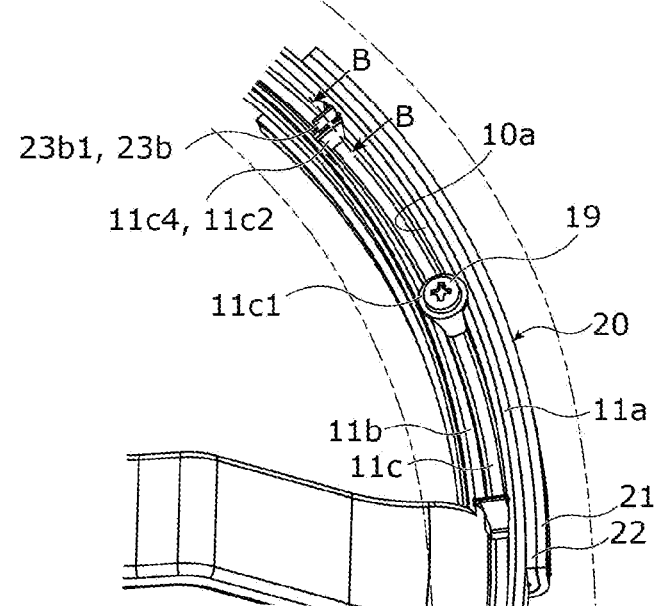
FIG. 4 is a perspective view of a first engagement-target portion, a second engagement-target portion, and a second engagement portion of a steering wheel according to the embodiment.
Figure 5:
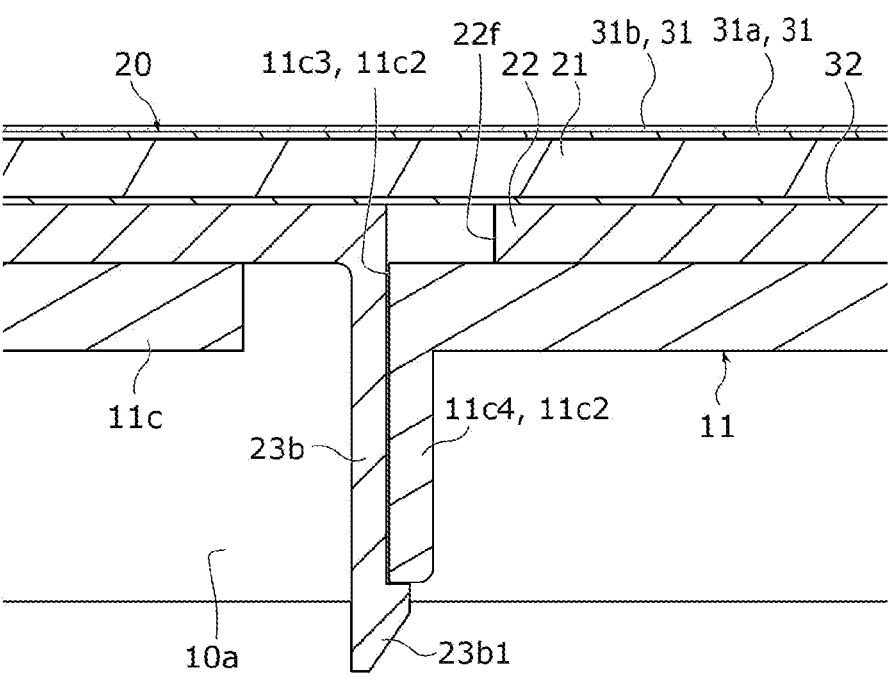
FIG. 5 is a cross-sectional view illustrating a second engagement-target portion and a second engagement portion of the steering wheel taken at line B-B in FIG. 4.
Figure 6:
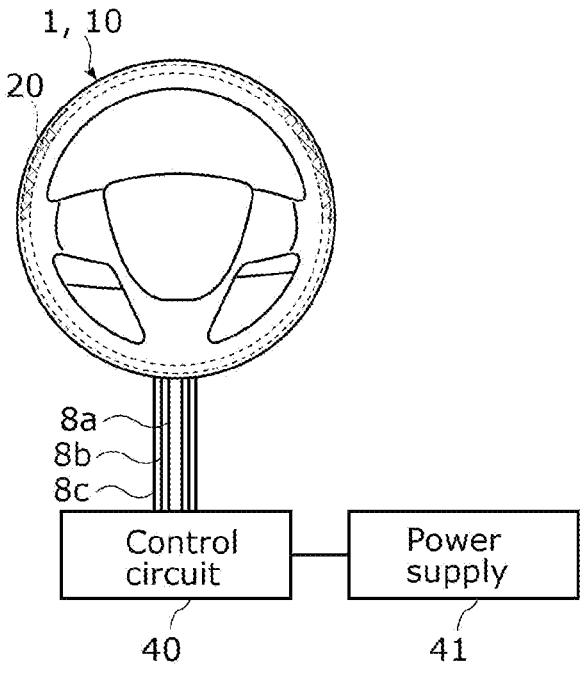
FIG. 6 is a block diagram of a steering wheel according to the embodiment.
Figure 7A:
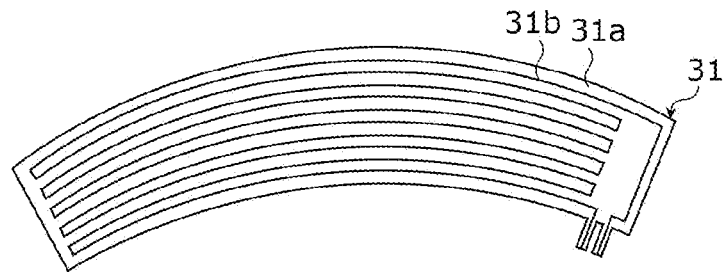
FIG. 7A is a plan view of a first electrode.
Figure 7B:
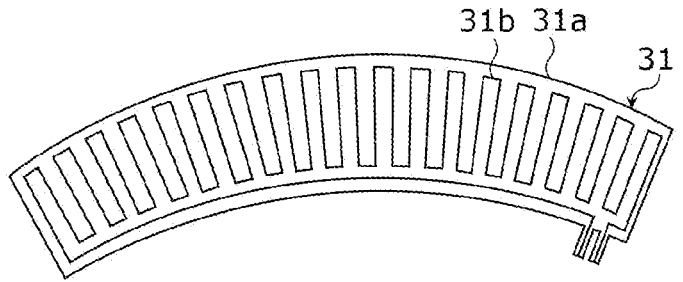
FIG. 7B is a plan view of another first electrode.

FIG. 1 illustrates a passenger compartment of vehicle 3 in which steering wheel 1 according to an embodiment is disposed. FIG. 2 includes a perspective view of steering wheel 1 according to the embodiment, a cross-sectional view of core metal 11 taken at the dotted and dashed line in FIG. 2, and a partial enlarged view of electrode structure 20. Illustrations of harnesses 8a, 8b, and 8c have been omitted in the partial enlarged view of first positioning portion 21t of first insulator 21 and second positioning portion 22t of second insulator 22 illustrated in FIG. 2. FIG. 3 is a cross-sectional view illustrating first engagement-target portion 11c1 and first engagement portion 23a of steering wheel 1 taken at line A-A in FIG. 2. FIG. 4 is a perspective view of first engagement-target portion 11c1, second engagement-target portion 11c2, and second engagement portion 23b of steering wheel 1 according to the embodiment. FIG. 5 is a cross-sectional view illustrating second engagement-target portion 11c2 and second engagement portion 23b of steering wheel 1 taken at line B-B in FIG. 4. FIG. 6 is a block diagram illustrating steering wheel 1 according to the embodiment. FIG. 7A is a plan view of first electrode 31. FIG. 7B is a plan view of another first electrode 31.

As illustrated in FIG. 1 and FIG. 2, steering wheel 1 imparts a steering angle to, for example, the steering of vehicle 3.

Steering wheel 1 includes rim 10. Rim 10 is integrally formed with T-shaped spoke 9 arranged on the inner circumferential surface of rim 10.

Rim 10 includes core metal 11, electrode structure 20, and foam 15 that covers electrode structure 20.

[Core Metal 11]

As illustrated in FIG. 2 and FIG. 3, core metal 11 is a metal annular core. More specifically, core metal 11 includes annular first portion 11a, annular second portion 11b arranged on the inner circumferential side of first portion 11a, and curved portion 11c that is curved and couples first portion 11a and second portion 11b. One end edge of first portion 11a is coupled to one end edge of curved portion 11c, and one end edge of second portion 11b is coupled to the other end edge of curved portion 11c. Stated differently, in a cross section of core metal 11 taken in a plane perpendicular to the circumferential direction of core metal 11 (hereinafter also referred to as the cross section of core metal 11), curved portion 11c is disposed between first portion 11a and second portion 11b. A cross section of core metal 11 taken in this manner is, for example, U-shaped, V-shaped, J-shaped, or C-shaped. In FIG. 2, core metal 11 is exemplified as having a U-shaped cross section. In the present embodiment, in a cross section of core metal 11, first portion 11a and second portion 11b are in the shape of a straight line.

Since core metal 11 has, for example, a U-shaped, V-shaped, J-shaped, or C-shaped cross section, first portion 11a, second portion 11b, and curved portion 11c form recessed portion 10a in core metal 11. Recessed portion 10a is formed in an annular shape. In the present embodiment, the opening of recessed portion 10a is formed in rim 10 so as to open toward the front of vehicle 3 (formed so as to open on the side of rim opposite the side that faces the seats).

As illustrated in FIG. 3 and FIG. 4, first engagement-target portion 11c1 and second engagement-target portion 11c2 are formed in recessed portion 10a.

First engagement-target portion 11c1 is formed on a rear surface of curved portion 11c, which is on the recessed portion 10a side, and is a cylindrical or round tubular projection that stands upright from the rear surface. Insertion hole 11d, in which fastener 19, such as a screw, and first engagement portion 23a of second insulator 22 are insertable, is formed on the inside of first engagement-target portion 11c1. Screw hole 11d1, in which fastener 19 is insertable, is formed on the bottom of first engagement-target portion 11c1, stated differently, the leading end of first engagement-target portion 11c1. First engagement-target portion 11c1 is included in the engagement-target portion.

As illustrated in FIG. 4 and FIG. 5, second engagement-target portion 11c2 includes insertion through-hole 11c3 and upright wall 11c4 formed in recessed portion 10a. Second engagement portion 23b of second insulator 22 is inserted inside insertion through-hole 11c3. Upright wall 11c4 is formed on the rear surface of curved portion 11c, which is on the recessed portion 10a side, and is a plate-shaped projection that stands upright from the rear surface. Upright wall 11c4 is capable of engaging with second engagement portion 23b inserted in insertion through-hole 11c3. Second engagement-target portion 11c2 is included in the engagement-target portion.

[Electrode Structure 20]

As illustrated in FIG. 1 and FIG. 2, electrode structure 20 is used in a device that detects the driver's hand gripping steering wheel 1. More specifically, to facilitate detection of the driver's grip on steering wheel 1, electrode structure 20 is disposed on the outer circumference of core metal 11 of steering wheel 1 provided in vehicle 3. Even more specifically, electrode structure 20 is provided on core metal 11 so as to cover a region from the outer circumferential side to the inner circumferential side of core metal 11, spanning from first portion 11a to second portion 11b through curved portion 11c of core metal 11. Stated differently, a plurality of electrode structures 20 are provided on core metal 11 so as to cover core metal 11, excluding recessed portion 10a of core metal 11.

Control circuit 40 in FIG. 1, which is capable of detecting the driver's hand gripping steering wheel 1, is electrically connected to electrode structure 20. When rim 10 is gripped by the driver's hand, the capacitance between the electrode of electrode structure 20 and the hand changes. Control circuit 40 detects the grip from the electrode of electrode structure 20 based on an output signal in which the capacitance has changed. More specifically, control circuit 40 measures the capacitance of the electrode or a value (amount of change) corresponding to the capacitance, and detects the driver's hand gripping rim 10 based on the value. Control circuit 40 is configured of a dedicated circuit or a general-purpose processor.

Electrode structure 20 is disposed on steering wheel 1 provided in vehicle 3. In the present embodiment, electrode structure 20 is embedded in rim 10 of steering wheel 1. In FIG. 1 for example, electrode structure 20 is exemplified as being provided on both the left and right sides of rim 10. In FIG. 1 for example, a pair of electrode structures 20 are exemplified as being provided on rim 10, but this example is non-limiting. For example, three or more electrode structures 20 may be provided on rim 10, and, alternatively, one electrode structure 20 may be provided on rim 10. Electrode structure 20 may be disposed on the entire circumference of rim 10 that is annular-shaped.

As illustrated in FIG. 2 and FIG. 3, electrode structure 20 includes first insulator 21, second insulator 22, first electrode 31, and second electrode 32.

In a cross section of steering wheel 1 taken in a plane perpendicular to the circumferential direction of rim 10 of steering wheel 1 (hereinafter also referred to as a cross section of rim 10), first insulator 21 is disposed along the inner circumferential side surface of core metal 11 from the outer circumferential side surface of core metal 11. Here, the inner circumferential side surface of core metal 11 is the surface on which spoke 9 is disposed, and the outer circumferential side surface of core metal 11 is the surface on the opposite side of core metal 11 relative to the inner circumferential side surface of core metal 11.

First insulator 21 includes first surface 21a and second surface 21b on opposite sides. Second surface 21b is the surface facing core metal 11.

First electrode 31 is disposed on first surface 21a, and second electrode 32 is disposed on second surface 21b. Stated differently, first insulator 21 is sandwiched between first electrode 31 and second electrode 32. First insulator 21 can thus arrange first electrode 31 and second electrode 32 so as to be spaced apart from one another and to overlap one another. In other words, first insulator 21 can arrange first electrode 31 and second electrode 32 so that first electrode 31 and second electrode 32 are not electrically connected.

First insulator 21 is made of a resin material such as a hard plastic such as polycarbonate, polybutylene terephthalate, or the like.

First insulator 21 has a certain thickness. A "certain thickness" means, for example, that first insulator 21 has a thickness of approximately a few millimeters. Since first insulator 21 has a certain thickness, first insulator 21 is rigid.

First insulator 21 and second electrode 32 are supported by second insulator 22 and are disposed spaced apart from core metal 11 by a predetermined distance. Stated differently, second electrode 32, which is disposed between first insulator 21 and second insulator 22, is disposed spaced apart from core metal 11 by a predetermined distance by second insulator 22.

Second insulator 22 is disposed between second electrode 32 and core metal 11. Second insulator 22 overlaps with first electrode 31, first insulator 21, and second electrode 32, and is covered by first electrode 31, first insulator 21, and second electrode 32. Second insulator 22 is disposed along the surface of core metal 11, in contact with the surface of core metal 11. In other words, second insulator 22 can insulate second electrode 32 from core metal 11 so that second electrode 32 and core metal 11 are not electrically connected.

First insulator 21 and second insulator 22 may be collectively referred to as the insulator. First insulator 21 and second insulator 22 are included in the insulator.

As illustrated in FIG. 3, FIG. 4, and FIG. 5, in a cross section of rim 10, second insulator 22 includes first engagement portion 23a that engages first engagement-target portion 11c1 included in core metal 11, and second engagement portion 23b that engages second engagement-target portion 11c2 included in core metal 11. First engagement portion 23a and second engagement portion 23b are included in the engagement portion.

As illustrated in FIG. 3, first engagement portion 23a engages first engagement-target portion 11c1 of core metal 11. More specifically, first engagement portion 23a can engage first engagement-target portion 11c1 by being inserted inside first engagement-target portion 11c1. In other words, first engagement portion 23a is a cylindrical or round tubular portion that stands upright from the surface of second insulator 22 facing core metal 11, and is fixed to first engagement-target portion 11c1 by being fitted inside first engagement-target portion 11c1.

First engagement portion 23a is a cylindrical or round tubular portion, but includes fastener hole 23a1 that corresponds to screw hole 11d1 of first engagement-target portion 11c1. In other words, first engagement portion 23a can be fastened with fastener 19 by inserting fastener 19 inserted through screw hole 11d1 of first engagement-target portion 11c1 into fastener hole 23a1 of first engagement portion 23a.

As illustrated in FIG. 4 and FIG. 5, second engagement portion 23b includes engagement claw 23b1 that engages second engagement-target portion 11c2 of core metal 11. More specifically, second engagement portion 23b includes engagement claw 23b1 that is inserted in insertion through-hole 11c3 of second engagement-target portion 11c2 and can engage upright wall 11c4 of second engagement-target portion 11c2. Second engagement portion 23b is a rod-shaped or plate-shaped portion that stands upright from the surface of second insulator 22 facing core metal 11, and when inserted in insertion through-hole 11c3 of second engagement-target portion 11c2, engagement claw 23b1 of second engagement portion 23b hooks onto upright wall 11c4 of second engagement-target portion 11c2.

One or more first engagement portions 23a and one or more second engagement portions 23b are disposed on second insulator 22. A plurality of first engagement-target portions 11c1 and a plurality of second engagement-target portions 11c2 may be formed on core metal 11 in accordance with the number of first engagement portions 23a and second engagement portions 23b. First engagement portion 23a, second engagement portion 23b, first engagement-target portion 11c1, and second engagement-target portion 11c2 may be disposed at approximately equal intervals on rim 10.

Second insulator 22 is made of a resin material such as a hard plastic such as polycarbonate, polybutylene terephthalate, or the like.

Second insulator 22 has a certain thickness. A "certain thickness" means, for example, that second insulator 22 has a thickness of approximately a few millimeters. Since second insulator 22 has a certain thickness, second insulator 22 is rigid.

As illustrated in FIG. 2, first insulator 21 includes first positioning portion 21t, and second insulator 22 includes second positioning portion 22t.

First positioning portion 21t is formed at the corner portions of both end portions of first insulator 21 that extends in the circumferential direction of core metal 11. Second positioning portion 22t is formed at the corner portions of both end portions of second insulator 22 that extends in the circumferential direction of core metal 11. In the present embodiment, first positioning portion 21t is exemplified as a recessed portion that interlocks with second positioning portion 22t, but first positioning portion 21t may be a protruding portion that interlocks with second positioning portion 22t. Second positioning portion 22t is exemplified as a protruding portion that interlocks with first positioning portion 21t, but second positioning portion 22t may be a recessed portion that interlocks with first positioning portion 21t. When assembling first insulator 21 to second insulator 22 while sandwiching second electrode 32 between first insulator 21 and second insulator 22, first positioning portion 21t is interlocked with second positioning portion 22t. Since this positions first insulator 21 and second insulator 22, misalignment of first insulator 21 and second insulator 22 in the circumferential direction can be inhibited, making it possible to easily and properly assemble first insulator 21 and second insulator 22.

Although first positioning portion 21t is exemplified as being formed at corner portions of first insulator 21, first positioning portion 21t may be formed at any location. Moreover, a plurality of first positioning portions 21t may be formed in first insulator 21. Although second positioning portion 22t is exemplified as being formed at corner portions of second insulator 22, second positioning portion 22t may be formed at any location. Moreover, a plurality of second positioning portions 22t may be formed in second insulator 22. For example, first positioning portions 21t may be formed at the four corner portions at both end portions of first insulator 21, and second positioning portions 22t may be formed at the four corner portions at both ends of second insulator 22.

First electrode 31 is in the shape of a line and disposed on first surface 21a of first insulator 21. First surface 21a is on the opposite side of first insulator 21 relative to the surface of first insulator 21 that faces core metal 11 of steering wheel 1.

First electrode 31 may include resin sheet 31*a* and conducting wire 31*b*. In other words, conducting wire 31*b* may be used as an electrode in first electrode 31.

Resin sheet 31*a* is a base material for arranging conducting wire 31*b* on one surface of resin sheet 31*a*. The other surface of resin sheet 31*a*, which is on the opposite side of resin sheet 31*a* relative to the one surface of resin sheet 31*a*, is disposed on first surface 21*a* of first insulator 21 to contact first surface 21*a*. Resin sheet 31*a* is formed in accordance with the size and shape of first surface 21*a* of first insulator 21 so that resin sheet 31*a* can be disposed on first surface 21*a*.

Resin sheet 31*a* may include, for example, polycarbonate (PC), polyethylene terephthalate (PET), a non-woven fabric, or a polyethylene (PE) mat. When resin sheet 31*a* is a non-woven fabric or a polyethylene (PE) mat, first electrode 31 can be disposed along first surface 21*a* of first insulator 21 even without a forming process performed on first electrode 31.

When resin sheet 31*a* is a non-woven fabric or a polyethylene mat, conducting wire 31*b* may be disposed on and sewed to one surface of resin sheet 31*a* with a sewing thread. One surface of resin sheet 31*a* is on the opposite side of resin sheet 31*a* relative to the other surface facing first surface 21*a* of first insulator 21. A sewing thread is a thread for sewing conducting wire 31*b* to resin sheet 31*a* along a direction in which conducting wire 31*b* extends, to fix conducting wire 31*b* to resin sheet 31*a*.

When conducting wire 31*b* is disposed on one surface of resin sheet 31*a*, it is possible to reduce the distance from the surface of rim 10 to conducting wire 31*b* compared with the case where conducting wire 31*b* is disposed on the other surface of resin sheet 31*a*. This enhances the sensitivity of detecting the driver's grip on steering wheel 1 and facilitates warming the surface of steering wheel 1. Conducting wire 31*b* may be disposed on the other surface of resin sheet 31*a*.

As illustrated in FIG. 7A, conducting wire 31*b* is a metal wire including, for instance, copper, aluminum, or silver. Conducting wire 31*b* is sewed to one surface of resin sheet 31*a* as one piece folded plurality of times, so that a serpentine pattern including straight portions along the circumferential direction of core metal 11 and folded portions is formed. As illustrated in FIG. 7B, conducting wire 31*b* may form, for example, a serpentine pattern in which the straight portions are approximately parallel to a direction orthogonal to the circumferential direction of core metal 11.

Although conducting wire 31*b* is disposed forming lines at approximately equal intervals on one surface of resin sheet 31*a*, as illustrated in FIG. 7A and FIG. 7B, this is non-limiting. For example, conducting wire 31*b* may be disposed so that conducting wire 31*b* in one part of one surface of resin sheet 31*a* is disposed with density higher than a reference density while conducting wire 31*b* in other part is disposed with density lower than the reference density. In other words, an area in which conducting wire 31*b* is disposed with more density and an area in which conducting wire 31*b* is disposed with less density may be formed on first electrode 31. By disposing conducting wire 31*b* on one surface of resin sheet 31*a* with more density in one part and less density in other part, variance in the surface temperature of rim 10 can be inhibited. When conducting wire 31*b* is disposed forming lines at approximately equal intervals, as illustrated in FIG. 7A and FIG. 7B, conducting wire 31*b* is disposed with density higher than the reference density by, for example, narrowing some of the intervals of conducting wire 31*b*. When the surface of rim 10 is also wrapped with leather, an area in which conducting wire 31*b* is disposed with more density and an area in which conducting wire 31*b* is disposed with less density may be formed on one surface of resin sheet 31*a* so that the surface temperature of the mat is uniform. The reference density is a preset density and may be set arbitrarily.

First electrode 31 may include a metal thin film formed through etching or application on resin sheet 31*a*. For example, conducting wire 31*b* as illustrated in FIG. 7A and FIG. 7B may be formed on one surface of resin sheet 31*a* through etching or application.

As illustrated in FIG. 2 and FIG. 6, first electrode 31 may include metal plating formed through etching or application on first surface 21*a* of first insulator 21. In other words, first electrode 31 may be composed without resin sheet 31*a*.

First electrode 31 is configured to function both as a sensor electrode that detects the driver's grip on steering wheel 1 and as a heater wire that warms steering wheel 1.

Specifically, first electrode 31 is exclusively used as a sensor electrode or is exclusively used as a heater wire. In other words, control circuit 40 selectively switches between the use of first electrode 31 as a sensor electrode and the use of first electrode 31 as a heater wire.

First electrode 31 may be a heater wire that warms steering wheel 1. In other words, first electrode 31 need not be used as a sensor electrode. Likewise, first electrode 31 need not be used as a heater wire and may be used as a sensor electrode only.

When using first electrode 31 as a sensor electrode, an AC voltage is applied to first electrode 31. The AC voltage applied to first electrode 31 is generated in control circuit 40 by power supplied from power supply 41. Since first electrode 31 is disposed on first surface 21*a* of first insulator 21, when a portion of rim 10 where first electrode 31 is disposed is gripped by the driver's hand, capacitance is formed between first electrode 31 and the hand. Accordingly, control circuit 40 can detect the driver's hand gripping rim 10 based on the change in capacitance.

When first electrode 31 is used as a heater wire, a DC voltage is applied to first electrode 31. The DC voltage applied to first electrode 31 is generated by power supply 41. First electrode 31 generates heat by power supplied from power supply 41 controlled in control circuit 40.

The following describes an example of the exclusive use of first electrode 31 as a sensor electrode and the exclusive use of first electrode 31 as a heater wire.

For example, first, an AC voltage is applied to first electrode 31 and first electrode 31 is used as a sensor electrode, and after that, the application of the AC voltage to first electrode 31 is stopped. When a predetermined time has elapsed after the stop of the AC voltage application to first electrode 31, a DC voltage is applied to first electrode 31 and first electrode 31 is used as a heater wire. In addition, the DC voltage application to first electrode 31 is stopped and when a predetermined time has elapsed, an AC voltage is applied to first electrode 31 and first electrode 31 is used as a sensor electrode. As can be seen in the repetition of such operation, first electrode 31 is exclusively used as a sensor electrode or is exclusively used as a heater wire.

When first electrode 31 is exclusively used as a sensor electrode or a heater wire by repeatedly switching between the use of first electrode 31 as a sensor electrode and the use of first electrode 31 as a heater wire, the duration of time in which first electrode 31 is used as a heater wire may be longer than the duration of time in which first electrode 31 is used as a sensor electrode.

Second electrode 32 is disposed on second surface 21*b* of first insulator 21. Second surface 21*b* is on the opposite side of first insulator 21 relative to first surface 21*a*. More specifically, second electrode 32 is disposed along second surface 21*b* of first insulator 21 so as to sandwich first insulator 21 with first electrode 31. Since second electrode 32 is sandwiched by first insulator 21 and second insulator 22, second electrode 32 can be said to be disposed on the surface of second insulator 22 that faces first insulator 21. In other words, second electrode 32 is disposed spaced apart from core metal 11 and first electrode 31. For this reason, second electrode 32 is not electrically connected to core metal 11 or first electrode 31.

Second electrode 32 according to the present embodiment includes a metal plate. In this case, the metal plate is attached to second surface 21*b* of first insulator 21 by an adhesive or the like. Second electrode 32 is, for example, metal including copper, aluminum, or silver.

Second electrode 32 may include a resin sheet and a metal thin film that is disposed on one surface of the resin sheet that faces second surface 21*b* of first insulator 21. Alternatively, second electrode 32 may include a metal sheet.

The resin sheet of second electrode 32 is a base material for arranging a metal thin film or a metal sheet for second electrode 32 on one surface of second electrode 32. The resin sheet of second electrode 32 is disposed on second surface 21*b* of first insulator 21 so that the other surface on the opposite side of the one surface contacts second surface 21*b* of first insulator 21. The resin sheet of second electrode 32 is formed in accordance with the size and shape of second surface 21*b* of first insulator 21 so that the resin sheet is disposed on second surface 21*b*.

The resin sheet of second electrode 32 may include, for example, a non-woven fabric. In this case, it is possible to dispose second electrode 32 along second surface 21*b* of first insulator 21 even without a forming process performed on second electrode 32.

Alternatively, second electrode 32 may include a metal thin film formed through etching or application on the resin sheet. Second electrode 32 may be formed, for example, through etching or application of the metal thin film of second electrode 32 on one surface of the resin sheet.

Alternatively, second electrode 32 may include metal plating formed through etching or application on second surface 21*b* of first insulator 21.

When first electrode 31 and second electrode 32 are formed using metal plating, since hole 22*f* is formed in the base of second engagement portion 23*b* in second insulator 22, hole 22*f* of second insulator 22 may be masked and the area of first surface 21*a* of first insulator 21 corresponding to hole 22*f* may be masked as well. With this, except for hole 22*f*, second electrode 32 can be formed on the surface of second insulator 22 on the first insulator 21 side, and except for the area corresponding to hole 22*f*, first electrode 31 can be formed on first surface 21*a* of first insulator 21. Stated differently, second electrode 32 is not formed on hole 22*f* of second insulator 22, and first electrode 31 is not formed on the area of first surface 21*a* of first insulator 21 that corresponds to hole 22*f*. As another method, first electrode 31 may be formed by metal plating first surface 21*a* of first insulator 21, and second electrode 32 may be formed by metal plating second surface 21*b* of first insulator 21.

When first electrode 31 is assembled to first insulator 21 and resin sheet 31*a* of first electrode 31 is a resin film made of polycarbonate or the like, a forming process is performed on first electrode 31. With this, first electrode 31 is formed along the shape of first surface 21*a* of first insulator 21. First electrode 31 that has been processed is disposed on first surface 21*a* of first insulator 21.

When second electrode 32 is assembled to first insulator 21 and second electrode 32 is a metal sheet or a metal plate, or the resin sheet of second electrode 32 is a resin film, a forming process is performed on second electrode 32. With this, second electrode 32 is formed along the shape of second surface 21*b* of first insulator 21. Second electrode 32 that has been processed is disposed on second surface 21*b* of first insulator 21.

In first electrode 31 and second electrode 32, when first electrode 31 and second electrode 32 are viewed so as to overlap, first electrode 31 is covered by the whole of second electrode 32, and the surface area of coverage of second surface 21*b* by second electrode 32 is greater than the surface area of coverage of first surface 21*a* by first electrode 31. For this reason, second electrode 32 can inhibit the formation of capacitance between first electrode 31 and core metal 11.

One end of first electrode 31 is electrically connected to harness 8*a* and the other end of first electrode 31 is electrically connected to harness 8*c*. Second electrode 32 is electrically connected to harness 8*b*.

Harness 8*a* may be electrically connected to one end of first electrode 31 by solder or crimping by a rivet. Harness 8*c* may be electrically connected to the other end of first electrode 31 via solder or crimping by a rivet.

Harness 8*b* may be electrically connected to second electrode 32 via solder or crimping by a rivet.

These harnesses 8*a*, 8*b*, and 8*c* are electrically connected to control circuit 40.

Control circuit 40 can apply an AC voltage to first electrode 31 and second electrode 32 via harnesses 8*a*, 8*b*, and 8*c*. Control circuit 40 can apply an AC voltage generated by power supply 41 to first electrode 31 and second electrode 32 via harnesses 8*a*, 8*b*, and 8*c*. By applying, to first electrode 31, an AC voltage having the same phase as the AC voltage applied to second electrode 32, the capacitance formed between first electrode 31 and core metal 11 can be canceled or reduced. Accordingly, control circuit 40 can accurately detect the capacitance formed between first electrode 31 and the driver's hand.

When first electrode 31 is used as a heater wire that warms steering wheel 1, control circuit 40 can apply a DC voltage to first electrode 31 via harnesses 8*a* and 8*c*. Control circuit 40 can apply a DC voltage generated by power supply 41 to first electrode 31 via harnesses 8*a* and 8*c*. Accordingly, first electrode 31 can generate heat by power supplied from power supply 41 controlled in control circuit 40, and warm steering wheel 1.

In a cross section of rim 10 of steering wheel 1, first insulator 21, second insulator 22, first electrode 31, and second electrode 32 are disposed at least in the range from the outer circumferential side portion of rim 10 of steering wheel 1 to the portion of rim 10 facing the rear of vehicle 3.

In the present embodiment, first insulator 21, second insulator 22, first electrode 31, and second electrode 32 are disposed along the circumferential direction of the cross section of rim 10 over a range of at least ¼th of the circumference. As illustrated in FIG. 3, first insulator 21, first electrode 31, and second electrode 32 are disposed over a range greater than range L between the two straight lines V1 and V2 made of long dashes broken by two short dashes. More specifically, first insulator 21, second insulator 22, first electrode 31, and second electrode 32 are disposed spanning from first portion 11*a* to second portion 11*b* through curved portion 11*c* of rim 10. In this way, first insulator 21, first electrode 31, and second electrode 32 are disposed in locations easily contacted by the driver's hand when the driver's hand grips rim 10, whereby the driver's grip on steering wheel 1 can be accurately detected by electrode structure 20.

[Foam 15]

As illustrated in FIG. 2, foam 15 is the portion that the driver grips with their hand, and forms the outer shell of rim 10 on steering wheel 1. Foam 15 is made of a resin material such as a urethane resin such as polyurethane, and covers electrode structure 20. First insulator 21, second insulator 22, first electrode 31, second electrode 32, and core metal 11 are embedded in foam 15. In other words, first insulator 21, second insulator 22, first electrode 31, second electrode 32, and core metal 11 are covered by foam 15.

<Method for Manufacturing Steering Wheel 1>

Figure 8:
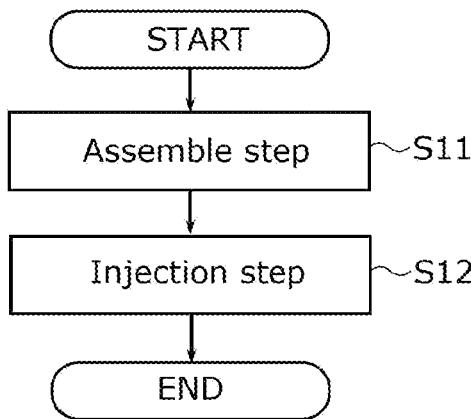
FIG. 8 is a flowchart showing a method for manufacturing a steering wheel according to the embodiment.

FIG. 8 is a flowchart showing a method for manufacturing steering wheel 1 according to the embodiment.

First, as illustrated in FIG. 8, a worker prepares core metal 11 and electrode structure 20. The engagement portion included in electrode structure 20 is caused to engage the engagement-target portion included in core metal 11, fastener 19 is inserted in fastener hole 23a1, and the engagement portion is fastened to core metal 11. With this, electrode structure 20 is assembled to core metal 11 (S11: assemble step). More specifically, first engagement-target portion 11c1 of core metal 11 engages first engagement portion 23a of second insulator 22. In other words, first engagement portion 23a is caused to engage first engagement-target portion 11c1, and first engagement portion 23a and first engagement-target portion 11c1 are fastened together by fastener 19 inserted in screw hole 11d1 of first engagement-target portion 11c1 and fastener hole 23a1 of first engagement portion 23a. Second engagement-target portion 11c2 of core metal 11 engages second engagement portion 23b of second insulator 22. In other words, engagement claw 23b1 of second engagement portion 23b included in electrode structure 20 is caused to engage second engagement-target portion 11c2 included in core metal 11. This yields a structure in which electrode structure 20 is fastened to core metal 11.

Next, the structure is fixed in the cavity of a mold and the mold is clamped. An injection molding resin is poured into the cavity in the mold through a gate formed in the mold, to form foam 15 that covers the structure in which electrode structure 20 is fastened to core metal 11 (S12: injection step). The injection molding resin is, for example, a resin material of a urethane resin such as polyurethane.

In this way, foam 15 can cover electrode structure 20 and core metal 11 while electrode structure 20 is engaged with core metal 11. This yields steering wheel 1.

Advantageous Effects

The advantageous effects of electrode structure 20, steering wheel 1, and the method for manufacturing steering wheel 1 according to the present embodiment will be described.

As described above, electrode structure 20 according to the present embodiment is disposed on the outer circumference of core metal 11 of steering wheel 1 provided in vehicle 3, and includes an insulator (first insulator 21 and second insulator 22) and first electrode 31 that is in the shape of a line, where first electrode 31 is disposed on first surface 21a of the insulator and first surface 21a is on the opposite side of the insulator relative to the surface of the insulator that faces core metal 11 of steering wheel 1. The insulator includes an engagement portion (first engagement portion 23a and/or second engagement portion 23b) that engages core metal 11.

According to this configuration, electrode structure 20 can be attached to core metal 11 in advance. Electrode structure 20 can therefore be disposed inside steering wheel 1 when forming steering wheel 1. For this reason, unlike the conventional technique, it is not necessary to make a notch in steering wheel 1 after forming steering wheel 1 to dispose first electrode 31.

Therefore, owing to electrode structure 20, an increase in manufacturing cost can be inhibited without compromising the appearance of steering wheel 1.

In electrode structure 20 according to the present embodiment, first electrode 31 is configured to function both as a sensor electrode that detects the driver's grip on steering wheel 1 and as a heater wire that warms steering wheel 1.

Since this allows first electrode 31 to function both as a sensor electrode and a heater wire, there is no need to provide a separate heater wire in steering wheel 1. It is therefore possible to inhibit an increase in the manufacturing cost of steering wheel 1 to which electrode structure 20 is applied.

In electrode structure 20 according to the present embodiment, first electrode 31 is a heater wire that warms steering wheel 1.

With this, it is possible to warm steering wheel 1 by first electrode 31 that is in the shape of a line and included in electrode structure 20 attached to core metal 11.

In electrode structure 20 according to the present embodiment, first electrode 31 is a sensor electrode that detects the driver's grip on steering wheel 1.

With this, it is possible to detect the driver's grip on steering wheel 1 by first electrode 31 that is in the shape of a line and included in electrode structure 20 attached to core metal 11.

Electrode structure 20 according to the present embodiment includes second electrode 32 disposed on second surface 21b which is on the opposite side of the insulator relative to first surface 21a.

According to the above configuration, electrode structure that includes second electrode 32 can be attached to core metal 11 in advance. Electrode structure 20 can therefore be disposed inside steering wheel 1 when forming steering wheel 1. For this reason, unlike the conventional technique, it is not necessary to make a notch in steering wheel 1 after forming steering wheel 1 to dispose second electrode 32.

Steering wheel 1 according to the present embodiment includes electrode structure 20, core metal 11, and foam 15 that covers core metal 11.

Steering wheel 1 configured in this manner also has the same advantageous effects as described above.

A method for manufacturing steering wheel 1 according to the present embodiment includes: engaging an engagement portion included in electrode structure 20 of steering wheel 1 with an engagement-target portion (first engagement-target portion 11c1 and/or second engagement-target portion 11c2) included in core metal 11; and covering core metal 11 using foam while the engagement portion is engaged with the engagement-target portion.

Electrode structure 20 can be firmly fastened to core metal 11 by the engagement of the engagement portion of electrode structure 20 and the engagement-target portion of core metal 11. For this reason, it is possible to inhibit the insulator from being displaced with respect to core metal 11 or being rotationally displaced with respect to the circumferential direction of steering wheel 1 due to pressure at the time of resin molding steering wheel 1. This method for manufacturing steering wheel 1 also has the same advantageous effects as described above.

In electrode structure 20 according to the present embodiment, in a cross section of steering wheel 1 taken in a plane perpendicular to the circumferential direction of steering wheel 1, first electrode 31 is formed along the shape of first surface 21*a* of the insulator and second electrode 32 is formed along the shape of second surface 21*b* of the insulator.

Since this allows the distance between first electrode 31 and second electrode 32 to be uniform, it is possible to accurately detect the driver's hand gripping steering wheel 1 regardless of which portion of steering wheel 1 the hand grips in an area in which electrode structure 20 is disposed.

In electrode structure 20 according to the present embodiment, the insulator includes first insulator 21 and second insulator 22. First surface 21*a* and second surface 21*b* are formed for first insulator 21. First electrode 31 is disposed on first surface 21*a* of first insulator 21. Second electrode 32 is disposed on second surface 21*b* of first insulator 21 that is on the opposite side of first insulator 21 relative to first surface 21*a*. Second insulator 22 is disposed between second electrode 32 and core metal 11. Second insulator 22 includes an engagement portion that engages core metal 11.

This allows second insulator 22 to position second electrode 32 away from core metal 11 and allows first insulator 21 to position first electrode 31 away from second electrode 32 and core metal 11. With this, since first electrode 31 and second electrode 32 can be disposed on first insulator 21, the member in which first insulator 21, first electrode 31, and second electrode 32 are integrated can be easily assembled to core metal 11.

In electrode structure 20 according to the present embodiment, in a cross section of steering wheel 1 taken in a plane perpendicular to the circumferential direction of steering wheel 1, first insulator 21, second insulator 22, first electrode 31, and second electrode 32 are disposed at least in a range from an outer circumferential side of steering wheel 1 to an inner circumferential side of steering wheel 1.

With this, electrode structure 20 can be disposed at a position where the driver's hand easily comes into contact with the surface of steering wheel 1 when the driver grips steering wheel 1 with their hand. Accordingly, it is possible to detect the driver's hand gripping steering wheel 1.

In electrode structure 20 according to the present embodiment, first insulator 21 comprises a resin material. Second insulator 22 comprises a resin material. First electrode 31 includes metal plating or a metal thin film. Second electrode 32 includes metal plating, a metal thin film, a metal sheet, or a metal plate.

With this, since first electrode 31 and second electrode 32 can be disposed on first insulator 21, the member in which first insulator 21, second insulator 22, first electrode 31, and second electrode 32 are integrated can be easily assembled to core metal 11. Furthermore, since second insulator 22 is disposed between first insulator 21 and second electrode 32 on one side and core metal 11 on the other, second insulator 22 can dispose first electrode 31 so as to be spaced apart from core metal 11.

In electrode structure 20 according to the present embodiment, first insulator 21 comprises a resin material. Second insulator 22 comprises a resin material. First electrode 31 includes resin sheet 31*a* and conducting wire 31*b*. Conducting wire 31*b* is disposed on and sewed to a surface of resin sheet 31*a* with a sewing thread. The surface of resin sheet 31*a* is on the opposite side of resin sheet 31*a* relative to the surface of resin sheet 31*a* that faces first surface 21*a* of first insulator 21. Second electrode 32 includes metal plating, a metal thin film, a metal sheet, or a metal plate.

With this, when disposing first electrode 31 on first surface 21*a* of first insulator 21 and disposing second electrode 32 on second surface 21*b* of first insulator 21, since resin sheet 31*a* is a material soft enough to sew conducting wire 31*b* with a sewing thread, it is possible to readily dispose first electrode 31 and second electrode 32 along the shape of first insulator 21 even without a forming process performed along the shapes of first surface 21*a* and second surface 21*b*. For this reason, it is possible to inhibit an increase in the processes related to the disposing of first electrode 31 on first surface 21*a* of first insulator 21 and the disposing of second electrode 32 on second surface 21*b* of first insulator 21.

In electrode structure 20 according to the present embodiment, first insulator 21 includes first positioning portion 21*t*. Second insulator 22 includes second positioning portion 22*t* that interlocks with first positioning portion 21*t*.

With this, when assembling first insulator 21 to second insulator 22, first positioning portion 21*t* and second positioning portion 22*t* can be interlocked. Since this positions first insulator 21 and second insulator 22, misalignment of first insulator 21 and second insulator 22 in the circumferential direction can be inhibited, making it possible to easily and properly assemble first insulator 21 and second insulator 22.

In electrode structure 20 according to the present embodiment, first electrode 31 is exclusively used as a sensor electrode or is exclusively used as a heater wire.

With this, when driving vehicle 3 in a cold area, it is possible not only to warm the steering wheel by turning ON a heating function to supply power to the first electrode (heater wire), but also to detect whether the driver's hand grips the steering wheel.

In electrode structure 20 according to the present embodiment, when first electrode 31 is used as a sensor electrode, an AC voltage having the same phase as the AC voltage applied to second electrode 32 is applied to first electrode 31.

With this, when first electrode 31 is used as a sensor electrode, the capacitance formed between first electrode 31 and core metal 11 can be canceled or reduced. Accordingly, if control circuit 40 for detecting the driver's hand gripping steering wheel 1 is used, control circuit 40 will be able to accurately detect the capacitance formed between first electrode 31 and the driver's hand when the hand grips steering wheel 1.

In electrode structure 20 according to the present embodiment, an engagement portion (first engagement portion 23*a* and/or second engagement portion 23*b*) is engaged with an engagement-target portion (first engagement-target portion 11*c*1 and/or second engagement-target portion 11*c*2) included in core metal 11.

With electrode structure 20 described above, the engagement of the engagement portion and the engagement-target portion can ensure the distance between first electrode 31 and the insulator and maintain the postures of first electrode 31 and the insulator. For this reason, when steering wheel 1 is resin-molded, electrode structure 20 can be assembled to steering wheel 1.

The engagement of the engagement portion and the engagement-target portion alone allows first insulator 21 to position first electrode 31 and second electrode 32 away from core metal 11, and the member in which first insulator 21 and first electrode 31 are integrated can be easily assembled to core metal 11.

Electrode structure 20 can be firmly fastened to core metal 11 by the engagement of the engagement portion and the engagement-target portion. For this reason, it is possible to inhibit the insulator from being displaced with respect to core metal 11 or being rotationally displaced with respect to the circumferential direction of steering wheel 1 due to pressure at the time of resin molding steering wheel 1. This consequently can inhibit an increase in the processes related to the manufacturing of steering wheel 1 and inhibit an increase in manufacturing cost.

Variation 1 of Embodiment

Electrode structure 120 and steering wheel 1a according to the present variation are different from the electrode structure and the steering wheel according to the embodiment in that electrode structure 120 and steering wheel 1a include first insulator 21, first electrode 31, and second electrode 32, but does not include a second insulator. In the present variation, elements having configurations and functions identical to those of the electrode structure and the steering wheel according to the embodiment share like reference signs, and detailed description regarding these elements and functions will be omitted where necessary.

First, the configuration of steering wheel 1a will be described with reference to FIG. 9 through FIG. 11.

Figure 9:
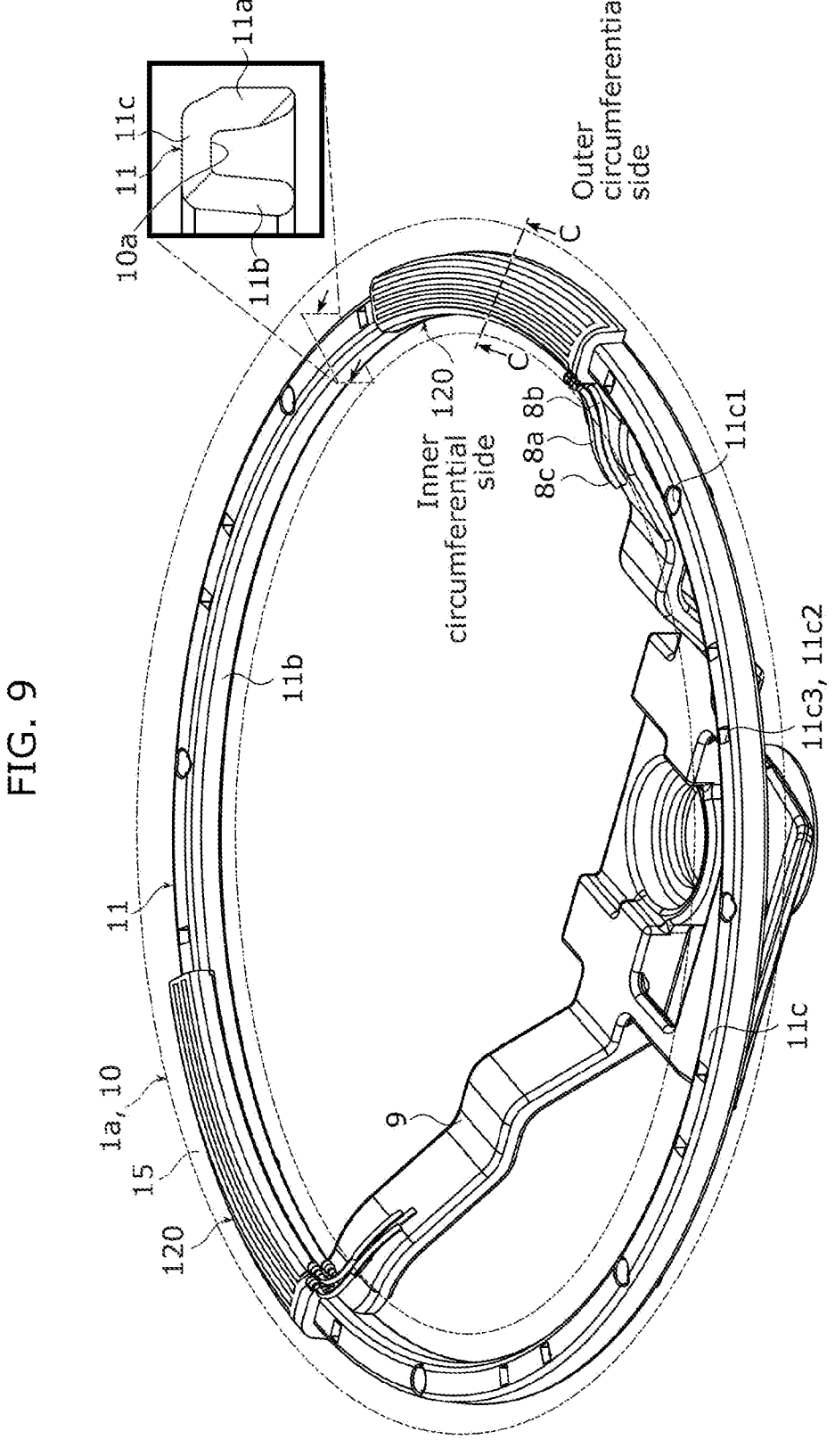
FIG. 9 includes a perspective view of a steering wheel according to Variation 1 of the embodiment and a cross-sectional view of a core metal according to Variation 1 of the embodiment.

FIG. 9 includes a perspective view of steering wheel 1a according to Variation 1 of the embodiment and a cross-sectional view of core metal 11 according to Variation 1 of the embodiment. FIG. 10 is a cross-sectional view illustrating first engagement-target portion 11c1 and first engagement portion 23a of steering wheel 1a taken at line C-C in FIG. 9. FIG. 11 is a cross-sectional view illustrating second engagement-target portion 11c2 and second engagement portion 23b of steering wheel 1a according to Variation 1 of the embodiment.

Figure 10:
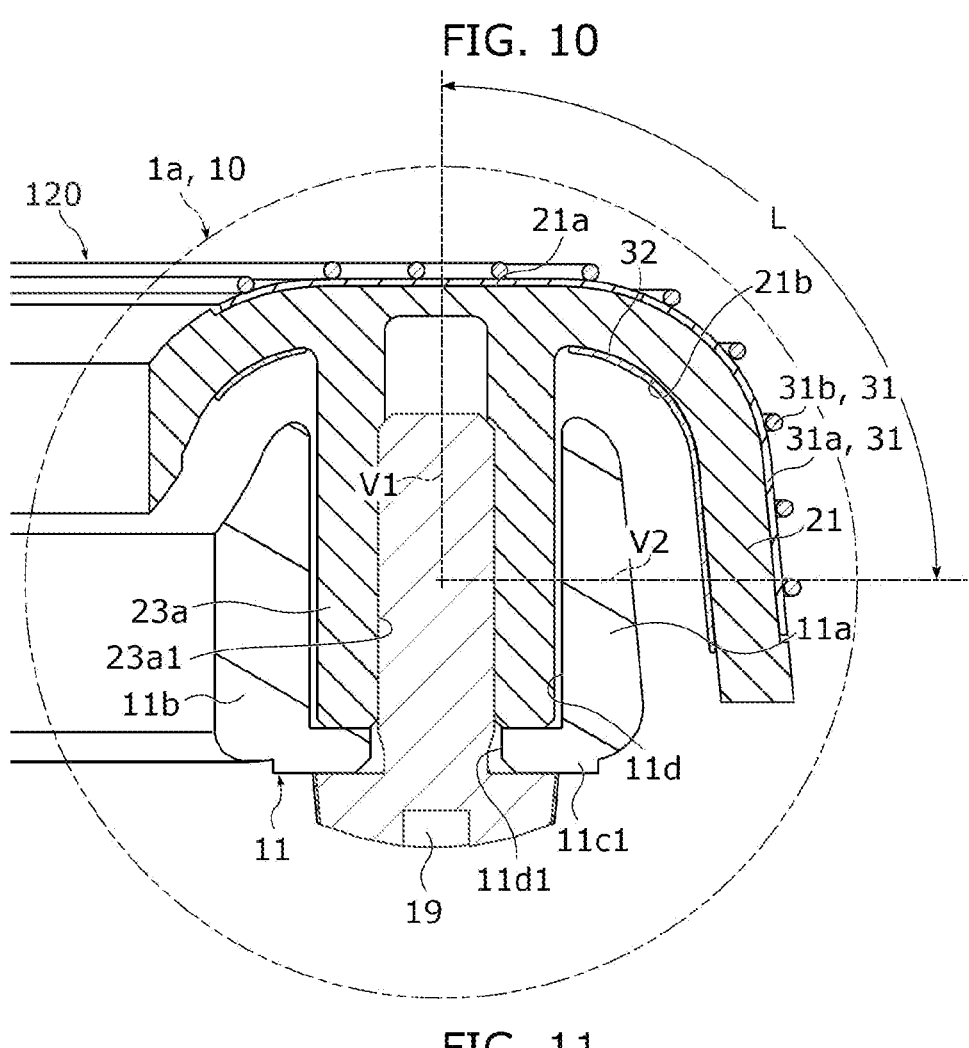
FIG. 10 is a cross-sectional view illustrating a first engagement-target portion and a first engagement portion of the steering wheel taken at line C-C in FIG. 9.
Figure 11:
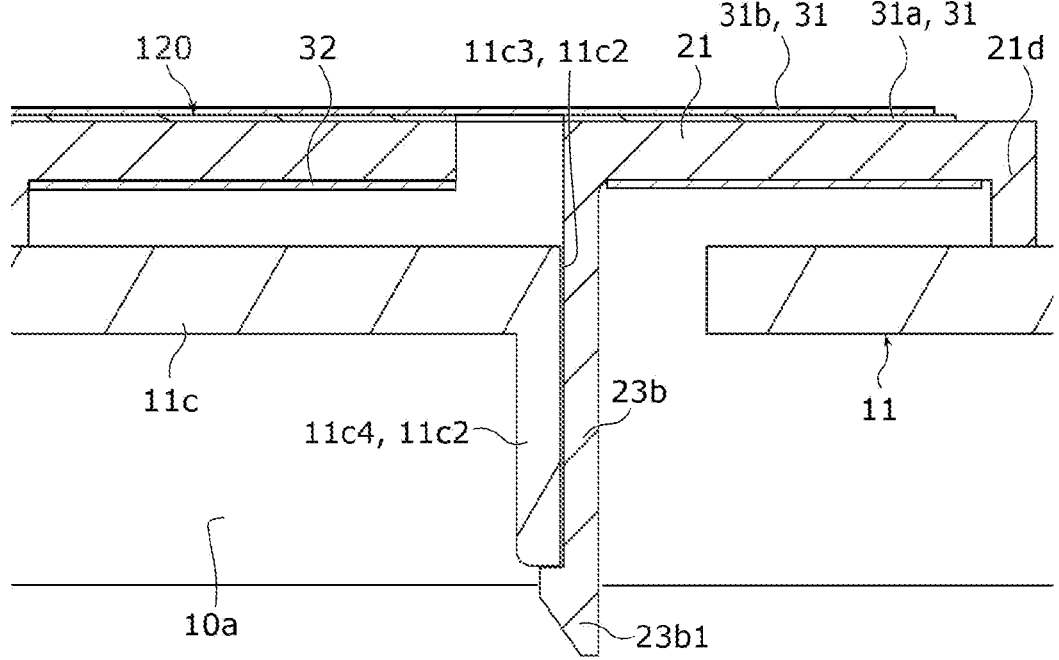
FIG. 11 is a cross-sectional view illustrating a second engagement-target portion and a second engagement portion of the steering wheel according to Variation 1 of the embodiment.

As illustrated in FIG. 9 through FIG. 11, electrode structure 120 according to the present variation includes first insulator 21, first electrode 31, second electrode 32, and projecting portion 21d.

First insulator 21 is arranged along the inner circumferential side surface of core metal 11 from the outer circumferential side surface of core metal 11. First insulator 21 includes first surface 21a and second surface 21b on opposite sides. Second surface 21b is the surface facing core metal 11. First electrode 31 is disposed on first surface 21a and second electrode 32 is disposed on second surface 21b. Second surface 21b is separated a predetermined distance from core metal 11 by projecting portion 21d. For this reason, second electrode 32 disposed on second surface 21b is disposed to be spaced apart from core metal 11. In an injection process, since foam 15 is disposed between second electrode 32 and core metal 11, second electrode 32 and core metal 11 are not electrically connected.

First insulator 21 can arrange first electrode 31 and second electrode 32 so as to be spaced apart from one another, so that first electrode 31 and second electrode 32 are not electrically connected and second electrode 32 and core metal 11 are not electrically connected either.

In a cross section of steering wheel 1a taken in a plane perpendicular to the circumferential direction of steering wheel 1a, first insulator 21 includes first engagement portion 23a that engages first engagement-target portion 11c1 included in core metal 11, and second engagement portion 23b that engages second engagement-target portion 11c2 included in core metal 11.

First engagement portion 23a can engage first engagement-target portion 11c1 by being inserted inside first engagement-target portion 11c1. In other words, first engagement portion 23a is a cylindrical or round tubular portion that stands upright from second surface 21b of first insulator 21, and is fixed to first engagement-target portion 11c1 by being fitted inside first engagement-target portion 11c1.

First engagement portion 23a is a cylindrical or round tubular portion, but includes fastener hole 23a1 that corresponds to screw hole 11d1 of first engagement-target portion 11c1. In other words, first engagement portion 23a can be fastened with fastener 19 by inserting fastener 19 inserted through screw hole 11d1 of first engagement-target portion 11c1 into fastener hole 23a1 of first engagement portion 23a.

Second engagement portion 23b includes engagement claw 23b1 that engages second engagement-target portion 11c2 of core metal 11. Specifically, second engagement portion 23b includes engagement claw 23b1 that is inserted in insertion through-hole 11c3 of second engagement-target portion 11c2 and can engage upright wall 11c4 of second engagement-target portion 11c2. In other words, second engagement portion 23b is a rod-shaped or plate-shaped portion that stands upright from second surface 21b of first insulator 21, and when inserted in insertion through-hole 11c3 of second engagement-target portion 11c2, engagement claw 23b1 of second engagement portion 23b hooks onto upright wall 11c4 of second engagement-target portion 11c2.

Projecting portion 21d is disposed at a position facing core metal 11 in first insulator 21. Projecting portion 21d projects from first insulator 21 toward core metal 11. A portion of the tip of projecting portion 21d abuts core metal 11. In other words, projecting portion 21d is disposed between first insulator 21 and core metal 11. Accordingly, projecting portion 21d can ensure that second electrode 32 is distanced from core metal 11 and maintain the posture of second electrode 32 relative to core metal 11 so that first insulator 21 and second electrode 32 do not contact core metal 11.

Projecting portion 21d is integrally formed with first insulator 21. Projecting portion 21d and first insulator 21 may be formed as individual separable elements.

A plurality of projecting portions 21d are disposed between core metal 11 and first insulator 21. Projecting portions 21d may be disposed at approximately equal intervals on core metal 11 and first insulator 21.

First electrode 31 is disposed on first surface 21a of first insulator 21. First surface 21a is the surface on the opposite side of first insulator 21 relative to the surface of first insulator 21 that faces core metal 11 of steering wheel 1a.

Electrode structure 120 configured as described above according to the present variation also has the same advantageous effects as those obtained with the electrode structure according to the embodiment.

Variation 2 of Embodiment

Electrode structure 220 and steering wheel 1b according to the present variation are different from the electrode structure and the steering wheel according to the embodiment in the following points: electrode structure 220 and steering wheel 1b include first insulator 21, first electrode 31, and second electrode 32, but does not include a second insulator; second electrode 32 is not disposed on second surface 21b; and first electrode 31 is disposed on one surface of resin sheet 33 and second electrode 32 is disposed on the other surface of resin sheet 33. The configurations of first insulator 21 and projecting portion 21d are same as those of the first insulator and the projecting portion according to Variation 1 of the embodiment. In the present variation, elements having configurations and functions identical to those of the electrode structure and the steering wheel according to Variation 1 of the embodiment share like reference signs, and detailed description regarding these elements and functions will be omitted where necessary.

First, the configuration of steering wheel 1*b* will be described with reference to FIG. 12 and FIG. 13.

Figure 12:
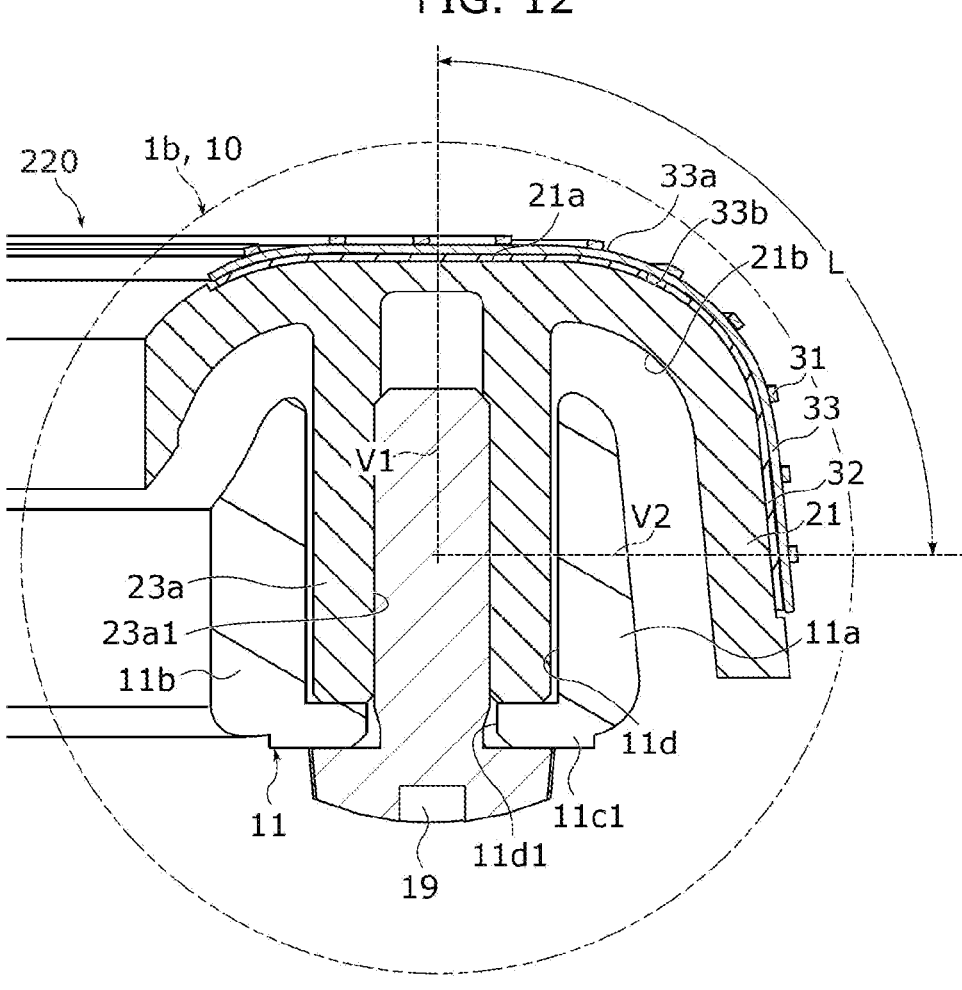
FIG. 12 is a cross-sectional view illustrating a first engagement-target portion and a first engagement portion of a steering wheel according to Variation 2 of the embodiment.

FIG. 12 is a cross-sectional view illustrating first engagement-target portion 11*c*1 and first engagement portion 23*a* of steering wheel 1*b* according to Variation 2 of the embodiment. FIG. 13 is a cross-sectional view illustrating second engagement-target portion 11*c*2 and second engagement portion 23*b* of steering wheel 1*b* according to Variation 2 of the embodiment.

Figure 13:
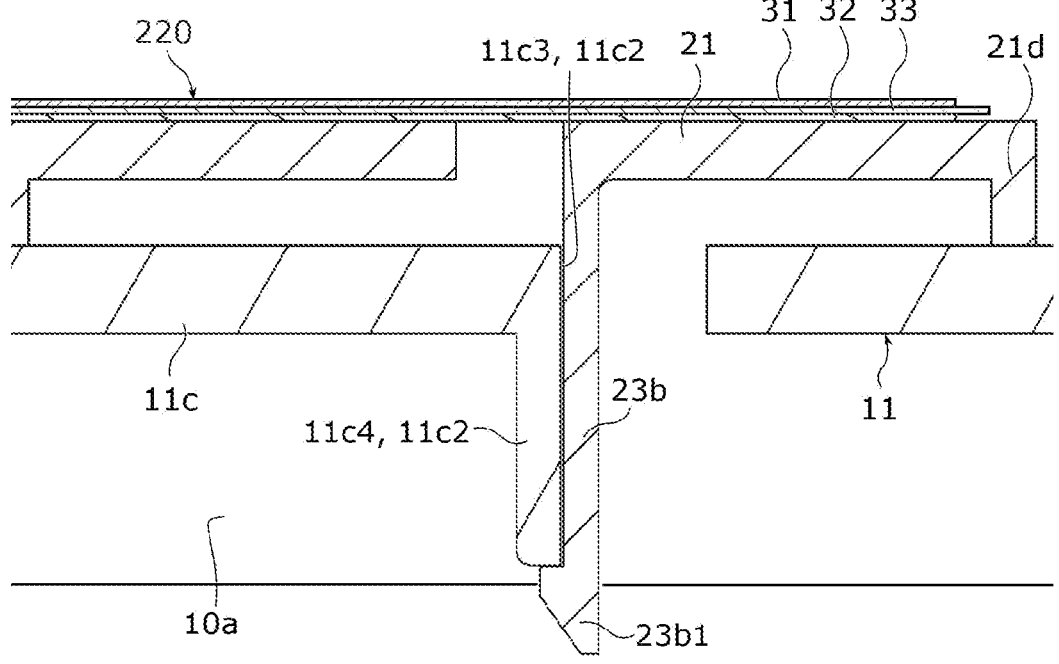
FIG. 13 is a cross-sectional view illustrating a second engagement-target portion and a second engagement portion of the steering wheel according to Variation 2 of the embodiment.

As illustrated in FIG. 12 and FIG. 13, electrode structure 220 according to the present variation includes resin sheet 33, first electrode 31, and second electrode 32 besides first insulator 21 and projecting portion 21*d*.

Resin sheet 33 is a base material for arranging first electrode 31 on one surface 33*a* and second electrode 32 on other surface 33*b* which is the rear surface of one surface 33*a*. Resin sheet 33 is disposed on first surface 21*a* of first insulator 21 so that other surface 33*b* faces first surface 21*a* of first insulator 21 with second electrode 32 interposed between first electrode 31 and first insulator 21.

Resin sheet 33 may include, for example, polycarbonate (PC), polyethylene terephthalate (PET), a non-woven fabric, or a polyethylene (PE) mat.

First electrode 31 is disposed on one surface 33*a* of resin sheet 33. First electrode 31 is an electrode that is in the shape of a line and forms a serpentine pattern on one surface 33*a* of resin sheet 33. First electrode 31 may include a conducting wire or thin film metal. First electrode 31 according to the present variation is thin film metal formed through etching or application on one surface 33*a* of resin sheet 33.

Second electrode 32 is disposed on other surface 33*b* of resin sheet 33 which is the surface facing first surface 21*a* of first insulator 21. Second electrode 32 is a solid electrode formed on other surface 33*b* of resin sheet 33. Second electrode 32 may include thin film metal or a metal sheet. Second electrode 32 according to the present variation is thin film metal formed through etching or application on other surface 33*b* of resin sheet 33.

A structure in which first electrode 31 is disposed on one surface 33*a* of resin sheet 33 and second electrode 32 is disposed on other surface 33*b* of resin sheet 33 is attached to first surface 21*a* of first insulator 21 by an adhesive or the like so that second electrode 32 faces first surface 21*a*.

Electrode structure 220 according to the present variation is disposed on the outer circumference of core metal 11 of steering wheel 1*b* provided in vehicle 3, and includes: resin sheet 33 disposed on first surface 21*a* of first insulator 21, where first surface 21*a* is on an opposite side of first insulator 21 relative to the surface of first insulator 21 that faces core metal 11 of steering wheel 1*b*; first electrode 31 that is in the shape of a line, where first electrode 31 is disposed on one surface 33*a* of resin sheet 33; and second electrode 32 disposed on other surface 33*b* which is the rear surface of one surface 33*a* of resin sheet 33 and is the surface that faces first surface 21*a* of first insulator 21. First insulator 21 includes an engagement portion (first engagement portion 23*a* and/or second engagement portion 23*b*) that engages core metal 11. First electrode 31 is configured to function both as a sensor electrode that detects the driver's grip on steering wheel 1*b* and as a heater wire that warms steering wheel 1*b*.

With this, it is possible to dispose first electrode 31 on one surface 33*a* of single resin sheet 33 and second electrode 32 on other surface 33*b* of single resin sheet 33. It is therefore possible, with electrode structure 220 according to the present variation, to inhibit an increase in manufacturing cost by inhibiting an increase in the number of components of electrode structure 220, compared with the case of using a resin sheet for each of the first electrode and the second electrode. This electrode structure 220 also produces the same advantageous effects as described above.

Variation 3 of Embodiment

Electrode structure 320 and steering wheel 1*c* according to the present variation are different from the electrode structure and the steering wheel according to the embodiment in the following points: electrode structure 320 includes first electrode 31, but includes neither a second electrode nor a second insulator; and first electrode 31 is disposed at an equal distance from surface 315*a* of foam 315. In the present variation, elements having configurations and functions identical to those of the electrode structure and the steering wheel according to any of the embodiment and Variations 1 and 2 of the embodiment share like reference signs, and detailed description regarding these elements and functions will be omitted where necessary.

Figure 14:
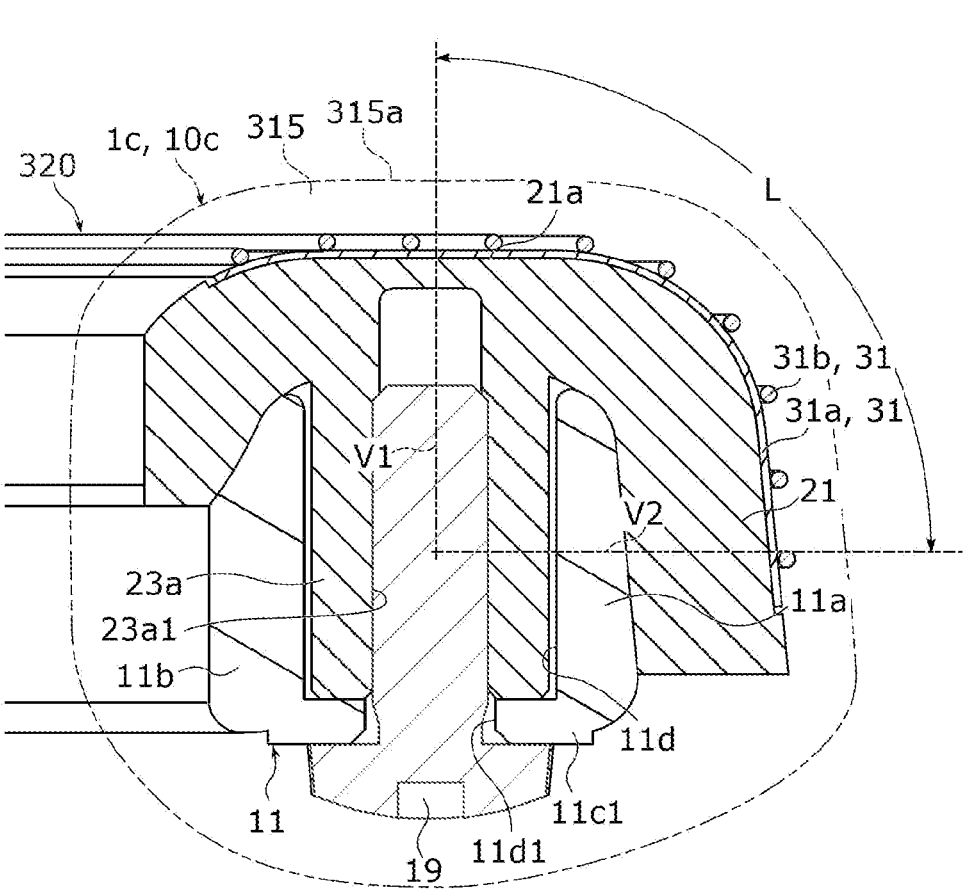
FIG. 14 is a cross-sectional view illustrating a first engagement-target portion and a first engagement portion of a steering wheel according to Variation 3 of the embodiment.

FIG. 14 is a cross-sectional view illustrating first engagement-target portion 11*c*1 and first engagement portion 23*a* of steering wheel 1*c* according to Variation 3 of the embodiment.

As illustrated in FIG. 14, rim 10*c* of steering wheel 1*c* according to the present variation includes core metal 11, electrode structure 320, and foam 315 that covers electrode structure 320.

In the present variation, first electrode 31 is disposed at an equal distance from surface 315*a* of foam 315. In other words, foam 315 has a portion whose thickness from first electrode 31 to surface 315*a* of foam 315 is approximately uniform. With this, it is possible to dispose first electrode 31 at an approximately same distance from surface 315*a* of foam 315. It is therefore possible to inhibit variance in detection sensitivity due to the gripping position of the driver's hand on steering wheel 1*c*, and detect the driver's grip on a portion corresponding to first electrode 31 of steering wheel 1*c*. In addition, in the case of using first electrode 31 as a heater wire, it is possible to inhibit variance in the surface temperature of rim 10*c*, and cause the surface temperature of the portion corresponding to first electrode 31 of steering wheel 1*c* to be approximately uniform.

Even when the thickness from first electrode 31 to surface 315*a* of foam 315 is approximately uniform, conducting wire 31*b* of first electrode 31 may be disposed so that the density of conducting wire 31*b* in part of one surface of resin sheet 31*a* is higher than a reference density while the density of conducting wire 31*b* in other part is lower than the reference density. The reference density is a preset density and may be set arbitrarily. By forming an area in which conducting wire 31*b* is disposed with more density and an area in which conducting wire 31*b* is disposed with less density on one surface of resin sheet 31*a*, in addition to the approximately uniform thickness of foam 315 and uniformly disposing conducting wire 31*b* on one surface of resin sheet 31*a*, it is possible to cause the surface temperature of rim 10 to be uniform.

Electrode structure 320 includes first insulator 21, first electrode 31, and a projecting portion. First electrode 31 according to the present variation may be configured to function both as a sensor electrode that detects the driver's grip on steering wheel 1*c* and as a heater wire that warms steering wheel 1c. First electrode 31 need not be used as a sensor electrode and may be a heater wire that warms steering wheel 1c. First electrode 31 need not be used as a heater wire and may be used as a sensor electrode only.

Other Variations

Although an electrode structure, a steering wheel, and a method for manufacturing the steering wheel according to the present disclosure have been described based on an embodiment described above, the present disclosure is not limited to the embodiment. Embodiments achieved by applying various modifications conceived by a person skilled in the art to the embodiment are also included in the present disclosure, so long as they do not depart from the spirit of the present disclosure.

For example, in the electrode structure, the steering wheel, and the method for manufacturing the steering wheel according to the embodiment, a core metal may not include a first engagement-target portion, but may include a second engagement-target portion. In this case, the electrode structure may not include a first engagement portion, but may include a second engagement portion. The core metal may not include a second engagement-target portion, but may include a first engagement-target portion. In this case, the electrode structure may not include a second engagement portion, but may include a first engagement portion.

In the electrode structure, the steering wheel, and the method for manufacturing the steering wheel according to the embodiment, electrode structures may be connected to each other along the circumferential direction of the core metal. For example, the coupling portion of one electrode structure may be connected to the coupling-target portion of an insulator of another electrode structure adjacent to that electrode structure. In this case, each of the harnesses may be electrically connected individually to a different one of the first electrodes and the second electrodes.

In the electrode structure, the steering wheel, and the method for manufacturing the steering wheel according to the embodiment, the core metal may be inverted so that the core metal has plane symmetry with respect to the plane of the opening on the inner circumferential side of the core metal, and the position at which the electrode structure is attached to the core metal may also be inverted. In other words, the core metal may be fixed to the spoke such that the opening of a recessed portion of the core metal faces the driver's seat. Moreover, the electrode structure may be attached to the side of the core metal that faces the front of the vehicle so as to cover the recessed portion of the core metal.

In the electrode structure, the steering wheel, and the method for manufacturing the steering wheel according to the embodiment, the steering wheel may further include a control circuit.

The embodiment and Variations 1 through 3 of the embodiment may be discretionarily combined in the electrode structure, the steering wheel, and the method for manufacturing the steering wheel according to the embodiment and Variations 1 through 3 of the embodiment; the present disclosure is not limited to the aspects disclosed in the embodiment and Variations 1 through 3 of the embodiment.

Embodiments achieved by applying various modifications conceived by a person skilled in the art to the embodiment as well as embodiments achieved by discretionarily combining elements and functions of the embodiment are also included in the present disclosure, so long as they do not depart from the spirit of the present disclosure.

24

(Supplementary Notes)

<Technical Aspect 1>

An electrode structure disposed on an outer circumference of a core metal of a steering wheel provided in a vehicle, the electrode structure comprising:

an insulator; and a first electrode in a shape of a line, the first electrode being disposed on a first surface of the insulator, the first surface being on an opposite side of the insulator relative to a surface of the insulator that faces the core metal of the steering wheel, wherein the insulator includes an engagement portion that engages the core metal.

<Technical Aspect 2>

The electrode structure according to Technical Aspect 1, wherein the first electrode is configured to function both as a sensor electrode that detects a driver's grip on the steering wheel and as a heater wire that warms the steering wheel.

<Technical Aspect 3>

The electrode structure according to Technical Aspect 1, wherein the first electrode is a heater wire that warms the steering wheel.

<Technical Aspect 4>

The electrode structure according to Technical Aspect 1, wherein the first electrode is a sensor electrode that detects a driver's grip on the steering wheel.

<Technical Aspect 5>

The electrode structure according to Technical Aspect 2, further comprising:

a second electrode disposed on a second surface of the insulator, the second surface being on an opposite side of the insulator relative to the first surface.

<Technical Aspect 6>

The electrode structure according to Technical Aspect 5, wherein in a cross section of the steering wheel taken in a plane perpendicular to a circumferential direction of the steering wheel:

the first electrode is disposed along a shape of the first surface of the insulator; and the second electrode is disposed along a shape of the second surface of the insulator.

<Technical Aspect 7>

The electrode structure according to Technical Aspect 5, wherein the insulator includes a first insulator and a second insulator, the first insulator includes the first surface and the second surface, the first electrode is disposed on the first surface of the first insulator, the second electrode is disposed on the second surface of the first insulator, the second surface being on an opposite side of the first insulator relative to the first surface, and the second insulator is disposed between the second electrode and the core metal, and includes the engagement portion that engages the core metal.

<Technical Aspect 8>

The electrode structure according to Technical Aspect 7, wherein in a cross section of the steering wheel taken in a plane perpendicular to a circumferential direction of the steering wheel, the first insulator, the second insulator, the first electrode, and the second electrode are disposed at least in a range from an outer circumferential side of the steering wheel to an inner circumferential side of the steering wheel.

<Technical Aspect 9>

The electrode structure according to Technical Aspect 7 or 8, wherein the first insulator comprises a resin material, the second insulator comprises a resin material, the first electrode includes metal plating or a metal thin film, and the second electrode includes metal plating, a metal thin film, a metal sheet, or a metal plate.

<Technical Aspect 10>

The electrode structure according to Technical Aspect 7 or 8, wherein the first insulator comprises a resin material, the second insulator comprises a resin material, the first electrode includes a resin sheet and a conducting wire, the conducting wire is disposed on and sewed to a surface of the resin sheet with a sewing thread, the surface being on an opposite side of the resin sheet relative to a surface of the resin sheet that faces the first surface of the first insulator, and the second electrode includes metal plating, a metal thin film, a metal sheet, or a metal plate.

<Technical Aspect 11>

The electrode structure according to any one of Technical Aspects 7 to 10, wherein the first insulator includes a first positioning portion, and the second insulator includes a second positioning portion that interlocks with the first positioning portion.

<Technical Aspect 12>

An electrode structure disposed on an outer circumference of a core metal of a steering wheel provided in a vehicle, the electrode structure comprising:

a first insulator;

a resin sheet disposed on a first surface of the first insulator, the first surface being on an opposite side of the first insulator relative to a surface of the first insulator that faces the core metal of the steering wheel;

a first electrode in a shape of a line, the first electrode being disposed on one surface of the resin sheet; and a second electrode disposed on an other surface of the resin sheet, the other surface being a rear surface of the one surface of the resin sheet and being a surface of the resin sheet that faces the first surface of the first insulator, wherein the first insulator includes an engagement portion that engages the core metal, and the first electrode is configured to function both as a sensor electrode that detects a driver's grip on the steering wheel and as a heater wire that warms the steering wheel.

<Technical Aspect 13>

The electrode structure according to any one of Technical Aspects 2, and 5 to 12, wherein the first electrode is exclusively used as the sensor electrode or is exclusively used as the heater wire.

<Technical Aspect 14>

The electrode structure according to any one of Technical Aspects 5 to 13, wherein when the first electrode is used as the sensor electrode, an AC voltage is applied to the first electrode, the AC voltage having a same phase as an AC voltage applied to the second electrode.

<Technical Aspect 15>

The electrode structure according to any one of Technical Aspects 1 to 14, wherein the engagement portion is engaged with an engagement-target portion included in the core metal.

<Technical Aspect 16>

A steering wheel comprising:

the electrode structure according to any one of Technical Aspects 1 to 15;

the core metal; and a foam that covers the core metal.

<Technical Aspect 17>

A method for manufacturing a steering wheel, the method comprising:

engaging the engagement portion included in the electrode structure of the steering wheel according to Technical Aspect 16 with an engagement-target portion included in the core metal; and covering the core metal using the foam while the engagement portion is engaged with the engagement-target portion.

Further Information about Technical Background to this Application

The disclosures of the following patent applications including specification, drawings and claims are incorporated herein by reference in their entirety: Japanese Patent Application No. 2022-028007 filed on Feb. 25, 2022, and Japanese Patent Application No. 2022-148967 filed on Sep. 20, 2022.

INDUSTRIAL APPLICABILITY

The electrode structure, the steering wheel, and the method for manufacturing the steering wheel according to the present disclosure are applicable to, for example, vehicle steering wheels.

The invention claimed is:

1. An electrode structure disposed on an outer circumference of a core metal of a steering wheel provided in a vehicle, the electrode structure comprising:

an insulator; and a first electrode in a shape of a line, the first electrode being disposed on a first surface of the insulator, the first surface being on an opposite side of the insulator relative to a second surface of the insulator that faces the core metal of the steering wheel, wherein the insulator includes a first engagement portion that engages with an engagement-target portion included in the core metal, the first engagement portion extends from the second surface of the insulator, the first engagement portion is inserted into the engagement-target portion, the first engagement portion includes a fastener hole into which a fastener is inserted, and the insulator engages with the engagement-target portion included in the core metal by inserting the fastener, which passes through the engagement-target portion, into the fastener hole of the first engagement portion.

2. The electrode structure according to claim 1, wherein the first electrode is configured to be switchable between functioning as a sensor electrode that detects a driver's grip on the steering wheel and functioning as a heater wire that warms the steering wheel.

3. The electrode structure according to claim 2, wherein the first electrode is selectively switched between use as the sensor electrode and use as the heater wire, such that the first electrode is exclusively used as either the sensor electrode or the heater wire at a given time.

4. The electrode structure according to claim 1, further comprising:

a second electrode disposed on the second surface of the insulator.

5. The electrode structure according to claim 4, wherein in a cross section of the steering wheel taken in a plane perpendicular to a circumferential direction of the steering wheel:

the first electrode is disposed along a shape of the first surface of the insulator; and the second electrode is disposed along a shape of the second surface of the insulator.

6. The electrode structure according to claim 4, wherein when the first electrode is used as a sensor electrode, an AC voltage is applied to the first electrode, the AC voltage having a same phase as an AC voltage applied to the second electrode.

7. The electrode structure according to claim 1, wherein the first electrode is a heater wire that warms the steering wheel.

8. The electrode structure according to claim 1, wherein the first electrode is a sensor electrode that detects a driver's grip on the steering wheel.

9. The electrode structure according to claim 1, wherein the insulator includes a first insulator and a second insulator, the first insulator includes the first surface and a third surface, the third surface being on an opposite side of the first insulator relative to the first surface, the first electrode is disposed on the first surface of the first insulator, the second insulator includes the second surface, the first engagement portion extends from the second surface of the second insulator, the electrode structure further comprises a second electrode is disposed on the third surface of the first insulator, and the second insulator is disposed between the second electrode and the core metal.

10. The electrode structure according to claim 9, wherein in a cross section of the steering wheel taken in a plane perpendicular to a circumferential direction of the steering wheel, the first insulator, the second insulator, the first electrode, and the second electrode are disposed at least in a range from an outer circumferential side of the steering wheel to an inner circumferential side of the steering wheel.

11. The electrode structure according to claim 9, wherein the first insulator comprises a resin material, the second insulator comprises a resin material, the first electrode includes metal plating or a metal thin film, and the second electrode includes metal plating, a metal thin film, a metal sheet, or a metal plate.

12. The electrode structure according to claim 9, wherein the first insulator comprises a resin material, the second insulator comprises a resin material, the first electrode includes a resin sheet and a conducting wire, the conducting wire is disposed on and sewed to a surface of the resin sheet with a sewing thread, the surface being on an opposite side of the resin sheet relative to a surface of the resin sheet that faces the first surface of the first insulator, and the second electrode includes metal plating, a metal thin film, a metal sheet, or a metal plate.

13. The electrode structure according to claim 9, wherein the first insulator includes a first positioning portion, and the second insulator includes a second positioning portion that interlocks with the first positioning portion.

14. A steering wheel comprising:

the electrode structure according to claim 1;

the core metal; and a foam that covers the core metal.

15. A method for manufacturing a steering wheel, the method comprising:

engaging the first engagement portion included in the electrode structure of the steering wheel according to claim 14 with the engagement-target portion included in the core metal; and covering the core metal using the foam while the first engagement portion is engaged with the engagement-target portion.

16. The electrode structure according to claim 1, wherein the insulator further includes a second engagement portion including an engagement claw.

17. The electrode structure according to claim 16, wherein the first engagement portion including the fastener hole and the second engagement portion including the engagement claw are provided at different positions in a circumferential direction of the core metal of the steering wheel.

18. The electrode structure according to claim 17, wherein the first engagement portion is a cylindrical or round tubular portion that extends from the second surface of the insulator.

19. The electrode structure according to claim 17, wherein the second engagement portion is a rod-shaped or plate-shaped portion that extends from the second surface of the insulator.

20. An electrode structure disposed on an outer circumference of a core metal of a steering wheel provided in a vehicle, the electrode structure comprising:

a first insulator;

a resin sheet disposed on a first surface of the first insulator, the first surface being on an opposite side of the first insulator relative to a second surface of the first insulator that faces the core metal of the steering wheel;

a first electrode in a shape of a line, the first electrode being disposed on one surface of the resin sheet; and a second electrode disposed on an other surface of the resin sheet, the other surface being a rear surface of the one surface of the resin sheet and being a surface of the resin sheet that faces the first surface of the first insulator, wherein the first insulator includes an engagement portion that engages with an engagement-target portion included in the core metal, the first electrode is configured to be switchable between functioning as a sensor electrode that detects a driver's grip on the steering wheel and functioning as a heater wire that warms the steering wheel, the engagement portion extends from the second surface of the first insulator, the engagement portion is inserted into the engagement-target portion, the engagement portion includes a fastener hole into which a fastener is inserted, and the first insulator engages with the engagement-target portion included in the core metal by inserting the fastener, which passes through the engagement-target portion, into the fastener hole of the engagement portion.

* * * * *